United States Patent [19]
Hirata et al.

[11] Patent Number: 5,708,908
[45] Date of Patent: Jan. 13, 1998

[54] COPYING MACHINE CONTROL SYSTEM WITH IMPROVED RELIABILITY OF COMMUNICATION FUNCTION AMONG COPYING MACHINES AND CENTRALIZED CONTROL UNIT

[75] Inventors: Sumiaki Hirata, Aichi-Ken; Kazunobu Maekawa, Toyokawa, both of Japan

[73] Assignee: Minolta Co., Ltd., Osaka, Japan

[21] Appl. No.: 406,653

[22] Filed: Mar. 20, 1995

Related U.S. Application Data

[63] Continuation of Ser. No. 719,137, Jun. 20, 1991, abandoned.

[30] Foreign Application Priority Data

| Jun. 22, 1990 | [JP] | Japan | 2-164882 |
| Jul. 6, 1990 | [JP] | Japan | 2-179893 |
| Jul. 10, 1990 | [JP] | Japan | 2-183629 |
| Jul. 18, 1990 | [JP] | Japan | 2-190102 |
| Jul. 25, 1990 | [JP] | Japan | 2-196887 |

[51] Int. Cl.$^6$ .................................................. G03G 15/00
[52] U.S. Cl. .................................................. 399/8; 399/21
[58] Field of Search .................................................. 355/200, 201, 355/203, 204, 208; 380/23, 51, 55; 395/200.12, 200.14; 364/240.9; 399/80, 8, 18, 21

[56] References Cited

U.S. PATENT DOCUMENTS

| 3,390,953 | 7/1968 | Johnstone | 364/474 |
| 4,322,813 | 3/1982 | Howard et al. | |
| 4,484,306 | 11/1984 | Kulczyckyi et al. | 364/900 |
| 4,497,037 | 1/1985 | Kato et al. | 364/900 |
| 4,583,834 | 4/1986 | Seko et al. | |
| 4,739,366 | 4/1988 | Braswell et al. | |
| 4,779,224 | 10/1988 | Moseley et al. | 364/900 |
| 4,952,985 | 8/1990 | Kawaguchi et al. | 355/206 |
| 5,034,770 | 7/1991 | O'Connell | 355/201 |
| 5,060,263 | 10/1991 | Bosen et al. | 380/25 |
| 5,077,581 | 12/1991 | Suzuki | 355/200 |
| 5,077,582 | 12/1991 | Kravette et al. | 355/206 |
| 5,077,795 | 12/1991 | Rourke et al. | 380/55 |
| 5,081,680 | 1/1992 | Bennett | 380/50 |
| 5,146,344 | 9/1992 | Bennett et al. | 358/296 |
| 5,220,674 | 6/1993 | Morgan et al. | 395/800 |
| 5,226,080 | 7/1993 | Cole et al. | 381/25 |
| 5,226,172 | 7/1993 | Seymour et al. | 395/800 |
| 5,261,070 | 11/1993 | Ohta | 395/425 |

FOREIGN PATENT DOCUMENTS 59-142559  2/1983  Japan.

OTHER PUBLICATIONS

Research Newsletter (Dataquest), pp. 1–6, (1989).

*Primary Examiner*—Robert Beatty
*Attorney, Agent, or Firm*—Burns, Doane, Swecker & Mathis, LLP

[57] ABSTRACT

A copying machine control system according to the present invention is a copying machine control system including data terminals collecting data related to copying machines, and a centralized control unit performing communication of data with the terminals through a communication network. Each terminal includes a holding device for holding an identification code for initialization and a first transmitter for transmitting an identification code to the centralized control unit when the centralized control unit is connected to a copying machine. The centralized control unit includes a memory for storing the identification code held in the data terminal, a confirming device for confirming a data terminal on the basis of the identification code and a second transmitter for transmitting the data for initialization to the confirmed data terminal, and the data terminal further includes an initialization device. The data terminals collects a first data relating to the frequency of use of the copy machine and a second data relating to operation of the copier (such as jams), compares the second data to a prescribed range and updates the range by either narrowing or expanding the range depending on the frequency of use.

15 Claims, 36 Drawing Sheets

DISCHARGE CODE : A SHEET OF PAPER
DISCHARGE =
TRAILING EDGE OF b0

JAM CODE : b7 = 1, b6 = 0
TROUBLE CODE : b7 = 1, b6 = 1

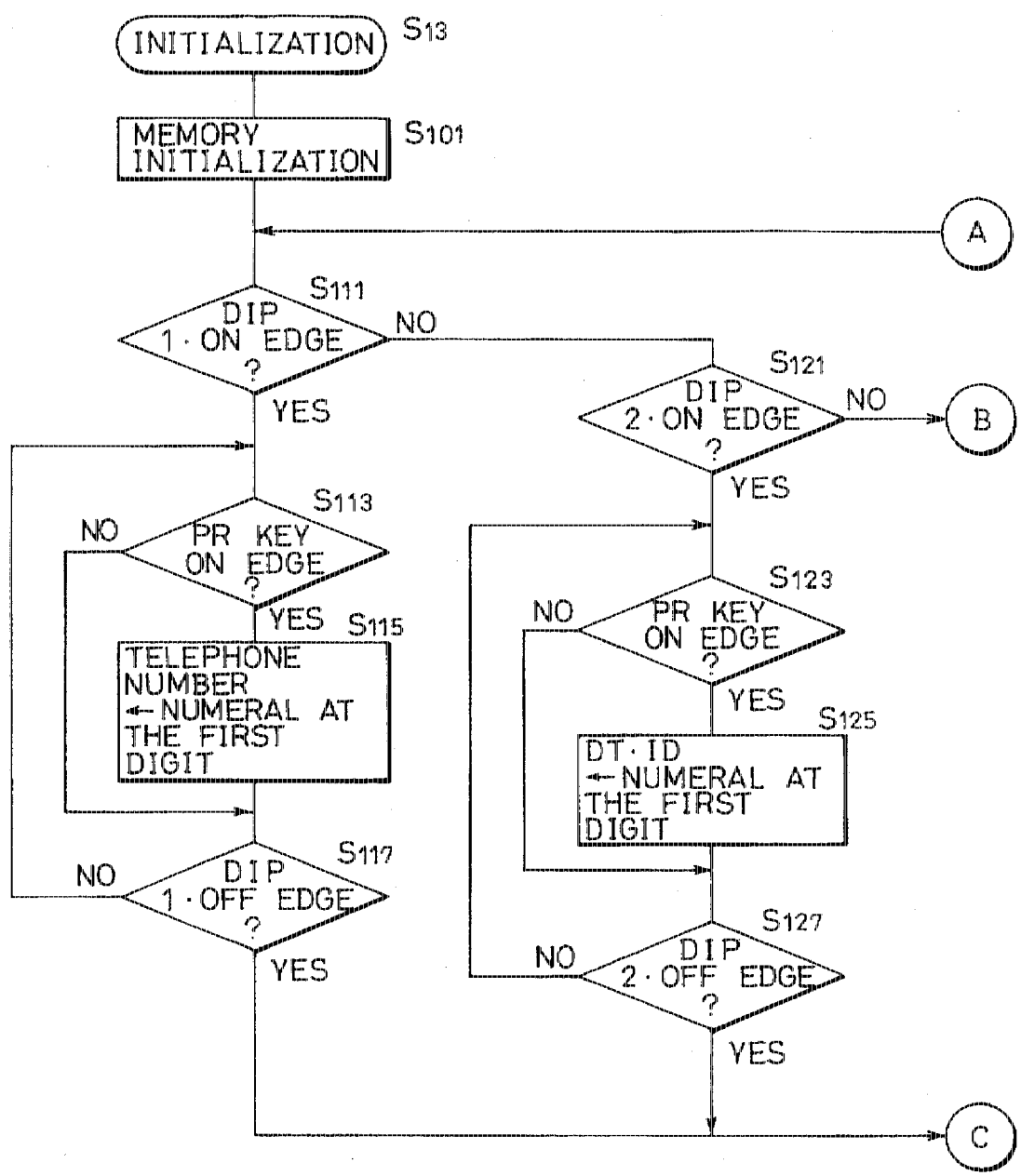

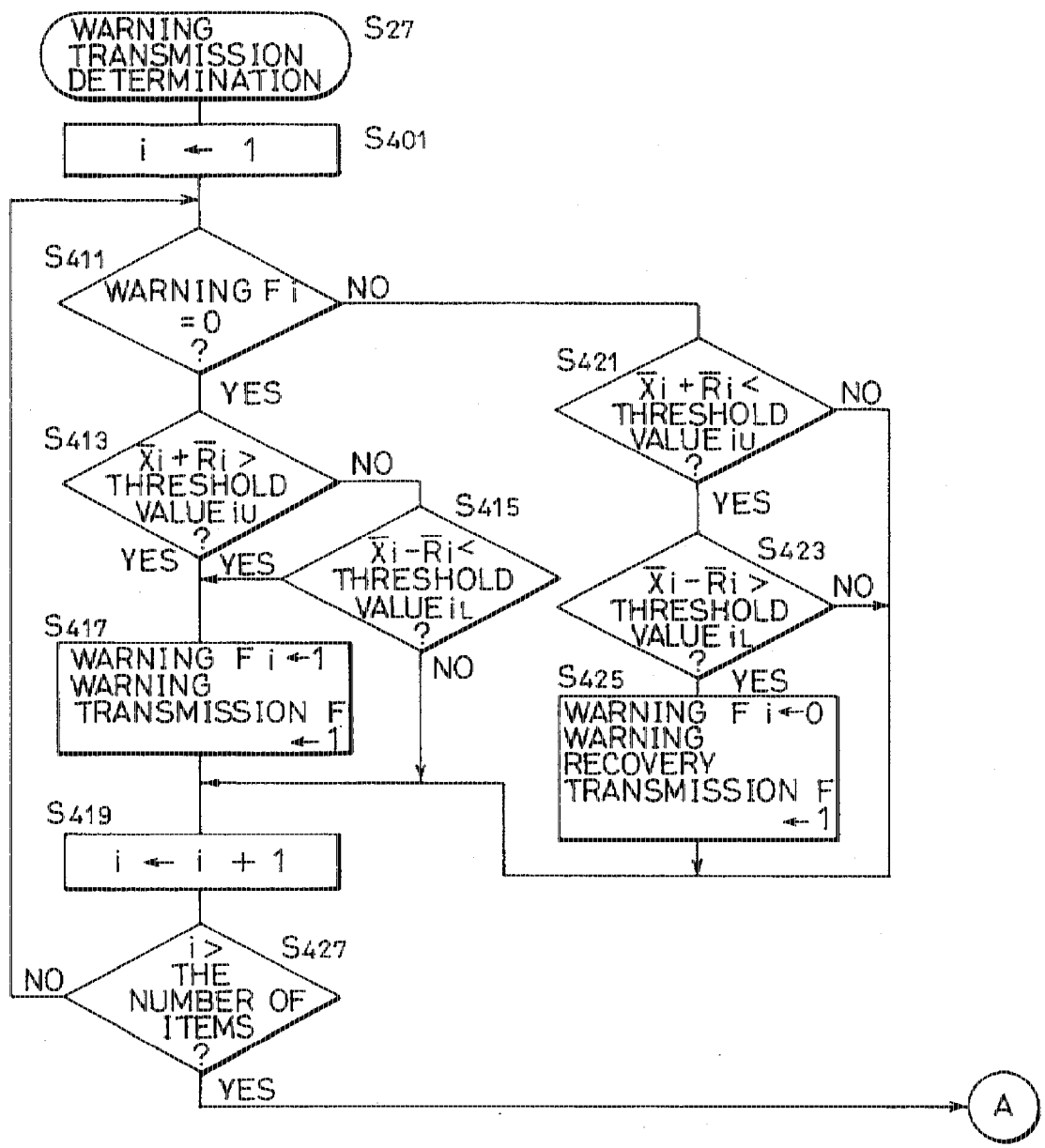

FIG.20

(CONTROL DATA)

| DTID | USER | MODEL | SERIAL No. | INITIALIZATION TRANSMISSION DATE AND HOUR |
|---|---|---|---|---|
| 0001 | AAA | EP1 | 000001 | . 21. 18:00 |
| 0002 | BBB | EP2 | 000001 | . 03. 10:30 |
| 0003 | CCC | AX1 | 000005 | . 22. 09:00 |
| 0004 | DDD | EP1 | 000014 | . 30. 11:24 |
| 0005 | EEE | EP1 | 000003 | . 06. 15:13 |
| | | | | |

COPYING MACHINE CONTROL SYSTEM WITH IMPROVED RELIABILITY OF COMMUNICATION FUNCTION AMONG COPYING MACHINES AND CENTRALIZED CONTROL UNIT

This application is a continuation of application Ser. No. 07/719,137, filed Jun. 20, 1991 now abandoned.

BACKGROUND OF THE INVENTION

1. Field of the Invention

The present invention relates to copying machine control systems, and particularly to a copying machine control system for controlling copying machines by transmitting data for controlling the copying machines to a centralized control unit on a control center side.

2. Description of the Related Art

A system for controlling a plurality of copying machines is disclosed in U.S. Pat. No. 4,583,834. In this disclosed system, various information of copying machines such as the total number of copies, troubles, remaining quantities of copy sheets and toner are transmitted to a computer. The computer processes the transmitted information and feeds back instructions to copying machines.

According to such a system, a plurality of copying machines supplied to users are connected to a centralized control unit through a communication network such as telephone lines for remote control of the copying machines. The centralized control unit is provided at a control base, and the controlling party receives with the centralized control unit the information transmitted from respective copying machines. Then, controlling works such as the issue of bills corresponding to the number of copies and dispatch of servicemen corresponding to the troubles are made.

Since general copying machines do not have functions of communicating with a centralized control unit through a communication network, a data terminal is attached to a copying machine for communication when configuring said system. This data terminal collects various information from the copying machine and communicates with the centralized control unit on the basis of the collected information.

In communicating with the data terminal, the centralized control unit has to recognize at which user the data terminal in communication is provided. If it doesn't, a bill will be issued on the basis of the information for a different user. Accordingly, when providing a data terminal at a certain user, the system must be configured so that the centralized control unit can recognize the user at which the data terminal is provided.

That data terminal communicates with the centralized control unit, but an object of the control is the copying machine. Accordingly, when a data terminal is optionally provided for a copying machine, it is necessary that the data terminal is correctly connected to the copying machine which is objective to the control. That is to say, when the centralized control unit recognizes a certain data terminal, if the data terminal is erroneously connected to a different copying machine, the centralized control unit will control the different copying machine. Especially, when a plurality of copying machines are provided at a single user, each data terminals must be correctly connected to each corresponding copying machine.

Now, data terminals communicate with the centralized control unit through a communication network, so that communication may be erroneously made with a different party due to cross or errors in the communication network. Accordingly, the data terminals and the centralized control unit must confirm destinations of communication with each other. Also, if the third party comes in through the communication network, information in the system may be lost or broken, so that it is required to enhance the safety of information communication among data terminals and the centralized control unit.

Also, the communication among data terminals and the centralized control unit is made when predetermined conditions are satisfied. For example, when a trouble occurs in a copying machine, the data terminal calls the centralized control unit. In this case, appropriate communication corresponding to the operational conditions of the copying machine is required, and it is necessary to generate warning at an early time in order not to make the trouble worse.

SUMMARY OF THE INVENTION

It is an object of the present invention to provide a copying machine control system capable of correctly controlling a plurality of copying machines.

It is another object of the present invention to provide a copying machine control system with enhanced safety of information communication.

It is still another object of the present invention to provide a copying machine control system capable of appropriate control of copying machines corresponding to their operational conditions.

It is yet another object of the present invention to provide a copying machine control system capable of collecting information from a copying machine by a data terminal and also correctly recognizing the data terminal.

It is still another object of the present invention to provide a copying machine control system which collects with data terminals information from copying machines in which data terminals are correctly connected to copying machines which are objectives of the control.

In order to achieve the above-described objects, a copying machine control system according to one aspect of the present invention is a copying machine control system including data terminals for collecting data related to copying machines, and a centralized control unit which performs data communication with the data terminals through a communication network, wherein a data terminal includes first storing means for storing first and second passwords, first password transmitting means for transmitting the first password stored in the first storing means to the centralized control unit after connection with the centralized control unit is made, first password receiving means for receiving second password from the centralized control unit after connection with the centralized control unit is made, and first controlling means for comparing the second password received by the first password receiving means and the second password stored in the first storing means and permitting data communication when the two coincide with each other, and the centralized control unit includes second storing means for storing first and second passwords, second password transmitting means for transmitting the second password stored in the second storing means to the centralized control unit after connection to the data terminal is made, second password receiving means for receiving first password from the data terminal after connection with the data terminal, and second controlling means for comparing the first password received by the second password receiving means and the first password stored in the second storing means and permitting data communication when the two coincide with each other.

The copying machine control system configured as described above permits data communication only when respective passwords of the data terminal and the centralized control unit coincide with each other, so that the safety of the information communication is enhanced.

In order to achieve the above-mentioned objects, a copying machine control system in accordance with another aspect of the present invention is a copying machine control system including data terminals for collecting data related to copying machines and a centralized control unit performing data communication with the data terminals through a communication network, wherein each data terminal includes holding means for holding an initialization identification code, first transmitting means for transmitting the initialization identification code to the centralized control unit when the centralized control unit is connected to the objective copying machine, and the centralized control unit includes storing means for storing the initialization identification code held in the data terminal, confirming means for confirming the data terminal on the basis of the initialization identification code transmitted from the first transmitting means of the data terminal, second transmitting means for transmitting initialization data to the data terminal confirmed by the confirming means, and the data terminal further includes initialization means for initializing the data terminal on the basis of the initialization data transmitted from the second transmitting means of the centralized control unit.

In the copying machine control system configured as described above, data terminals are initialized on the basis of the data for initialization transmitted from the centralized control unit on the basis of the identification code for initialization transmitted from the data terminal, so that the reliability of controlling a plurality of copying machines is enhanced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8A and 8B are flow charts showing specific contents of the initialization routine of FIG. 7.

FIG. 20 is a diagram showing contents of data for controlling each copying machine stored in the center of FIG. 1.

DESCRIPTION OF THE PREFERRED EMBODIMENTS

Embodiments of the present invention will be described below.

[1] Entire Structure of System

First, referring to FIGS. 1–5, schematic configuration of the system will be described.

Figure 1:
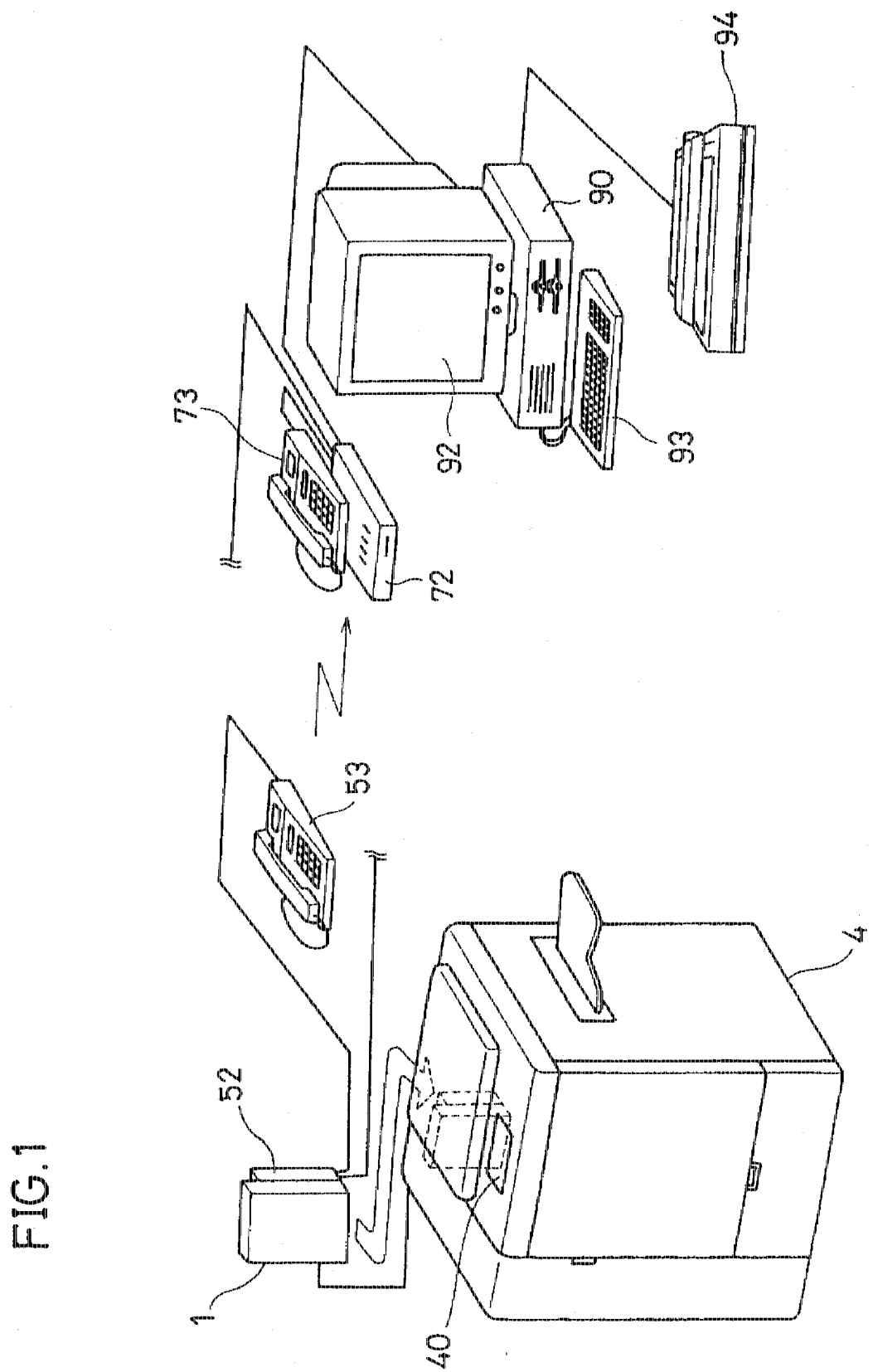
FIG. 1 is a schematic perspective view showing the configuration of a copying machine control system according to the first embodiment of the present invention.
Figure 2:
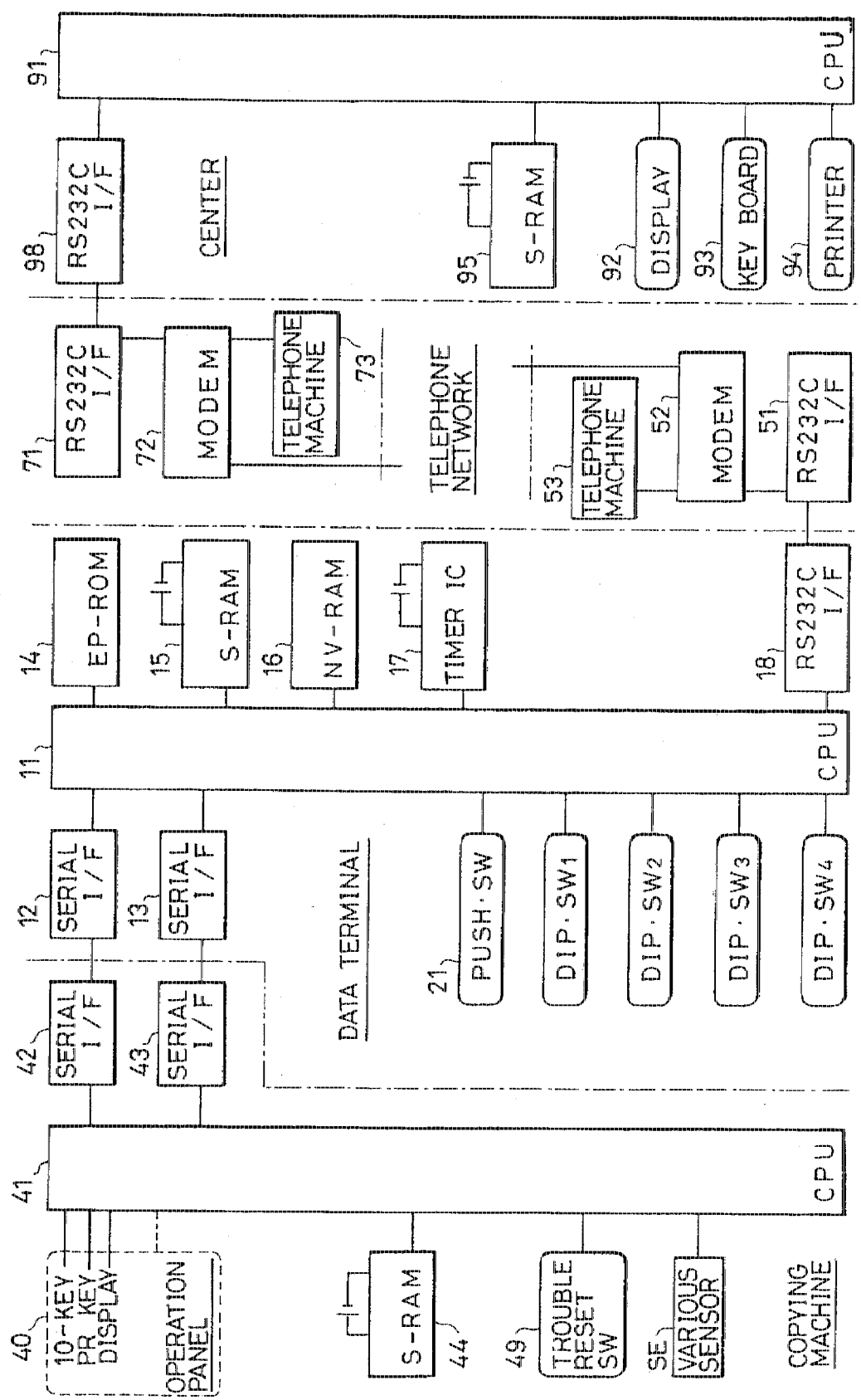
FIG. 2 is a block diagram showing circuit configuration of the copying machine control system of FIG. 1.

As shown in FIGS. 1 and 2, the system includes a number of user side equipments (a set of user side apparatus is shown in the figure), center side apparatus which is a control party, and a communication network connecting these.

A copying machine 4, a DT (Data Terminal) 1, a modem 52 having a function as a communication terminal device, and a telephone machine 53 as a communication device are provided on the user side. The data terminal 1 takes in various kinds of information from copying machine 4, applies predetermined processes thereto, and transmits the same to a computer on the center side.

On the other hand, a modem 72 having a function as a communication terminal device, a computer (a main body 90, a display 92, a keyboard 93, a printer 94 and the like), and a telephone machine 73 which is a communication device are provided on the center side, which produce data for controlling copying machines on the basis of the data received through the communication network (a telephone network, for example) to perform necessary processes.

Next, each device will be described.

Copying Machine 4

Copying machine 4 is an apparatus for forming a copied image on paper by original image scanning.

In copying machine 4, various kinds of element data having effects upon the image forming process (a time required for paper transport, a surface potential of a photoreceptor drum, a toner concentration in a developer, an amount of exposure of the photoreceptor drum, a developing bias voltage, an amount of toner sticking on photoreceptor drum, a grid voltage of a corona charger, etc.) are detected by a group of various sensors SE, which are taken in and processed in CPU 41, and then transmitted to CPU 11 of DT1 through a serial I/F43 and a serial I/F13. The above-described various kinds of element data are expressed in an abstract manner as element data $X_i$ (i=1—the number of items of the element data) in the description of flow charts described later.

In copying machine 4, each of counted values is counted in each counter as a base of an amount of charge asked from the management side (a total counter indicating the number of times of paper discharge and a counter for each paper size indicating the number of sheets used for each paper size), counters as criteria for maintenance (a JAM counter for each portion indicating the number of jams for each portion, a trouble counter for each portion indicating the number of troubles for each portion, and a PM counter for each part indicating the number of times each part is used), and transmitted to CPU 11 of DT1 through serial I/F42 and serial I/F12. The PM counter is a counter for counting the number of times each part is used, which is a criterion of the time for parts replacement.

Also, copying machine 4 performs predetermined operations or mode settings with signals from various kinds of key switches on the operation panel (FIG. 4) (a print (PR) key 46 for commanding start of copying operation, a group of ten keys 47 for numerical input, a clear key 48 for commanding to clear input data, etc.), various kinds of switches out of the operation panel (a trouble reset switch 49 for commanding reset of troubles, etc.), and transmits a corresponding signal as needed to CPU 11 of DT1 through serial I/F 42 and serial I/F 12. Numerical data displayed in display portion 45 is also included in the transmitted data.

Also, as data peculiar to each copying machine, a machine type (model) name, and serial number data are stored in S-RAM 44 when being delivered from a factory.

Data Terminal 1

It is a device for taking in and processing data of copying machine 4, and when predetermined transmission conditions (conditions in which a transmission flag is set to "1": refer to the description of control set forth later about the details) are satisfied, it activates modem 52 to connect the communication line to the center side and transmits control data of the copying machine (element data, count data, etc.) to the center side.

As shown in FIG. 2, controlling CPU 11 of the data terminal 1 is connected to an EP-ROM 14 in which control program is stored, a non-volatile memory 16 for storing selection number data (described later) and the like, an S-RAM 15 for works battery-backed up, and a timer IC 17 also battery-backed up.

CPU 11 takes in data transmitted from copying machines 4 through a serial I/F 12 or a serial I/F 13 to conduct processes described later.

Figure 5:
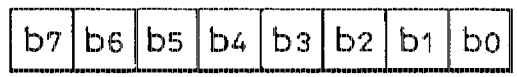
FIG. 5 is a diagram showing the configuration of data transmitted from the copying machine of FIG. 1.

FIG. 5 is a diagram showing configuration of 8-bit data $b_7$–$b_0$ inputted to DT1 through serial I/F 12. A paper discharge code indicating discharge of paper is expressed by a trailing edge (a change from 1 to 0). A JAM code indicating occurrence of paper jam is expressed as bit $b_7=1$, bit $b_6=0$. A trouble code indicating occurrence of various kinds of troubles is expressed as bit $b_7=1$, $b_6=1$. Furthermore, a position of the paper jam and a type of the trouble are expressed by bits $b_5$–$b_1$. The 8-bit data is periodically inputted to DT1 and also inputted when paper jam or a trouble occurs in a copying machine.

Figure 3:
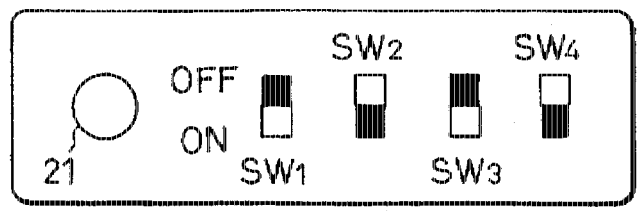
FIG. 3 is a diagram for describing operation switches in the copying machine control system of FIG. 1.
Figure 4:
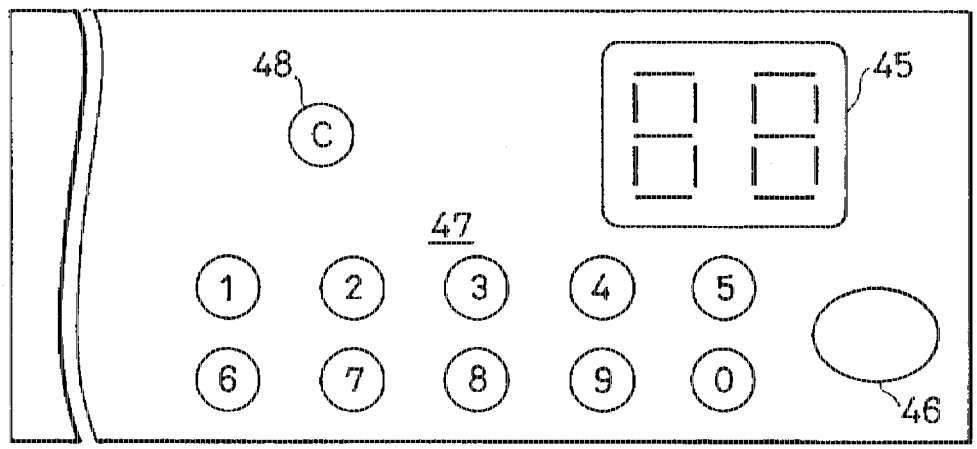
FIG. 4 is a diagram for describing an operation panel of the copying machine in the copying machine control system of FIG. 1.

CPU 11 also makes predetermined operation or mode setting according to input of operation switches. As the above-mentioned operation switches, as Shown in FIG. 3, there are provided four dip switches DIP•SW 1–DIP•SW 4 and a push switch 21.

DIP•SW4 is a switch for setting an initialization mode. DIP•SW1 is a switch for setting a center selection number (telephone number) input mode, DIP•SW2 for an ID number (DTID) input mode for distinguishing DTs 1, and DIP•SW3 for an ID number (center ID) input mode for distinguishing a center, respectively. Push switch 21 is a switch for commanding initialization transmission (refer to S151 in FIG. 8A), etc.

CPU 11 is also connected to modem 52 which is a communication terminal device through a communication interface (RS232CI/F) 18 on the CPU 11 side and a communication interface (RS232CI/F) 51 on the modem 52 side. That is to say, the data terminal is configured to be able to communicate with a computer at the center by connecting a communication line with modem 72 on the center side by implementing transmission of an off-hook signal and a center selection number signal to the communication line from modem 52 through these equipments.

The contents of data transmitted from data terminal 1 to the center side (the data for controlling copying machines) are determined by a type of a transmission flag set to "1" as will be described later.

Center Side Equipments

The center side equipment is a computer apparatus configured to be connected to a number of data terminals through the communication network. By this apparatus, copying machines being connected to respective data terminals are controlled, respectively.

That is, the data transmitted from data terminal 1 side to mode 72 through the communication network is sequentially inputted to CPU 91 through the communication interface (RS232CI/F) 71 on the modem 72 side and the communication interface (RS232CI/F) 98 on the computer side. CPU 91 processes the data (the above element data, count data, etc.) to produce or updates data for controlling the copying machine 4 connected to that data terminal 1.

Although a battery-backed up S-RAM 95 is employed as an auxiliary storage device of CPU 91 in this embodiment, a magnetic disc recording device or an optical disc recording device or the like may be employed instead.

Also, it prints out bills on the basis of the controlling data, makes instructions about the serviceman dispatch, and furthermore makes selection of parts and so forth to be prepared in the dispatch.

At a fixed time communication (the communication made with a fixed time transmission flag set to "1") time, the next fixed-time transmission time data and so forth are transmitted to the data terminal 1 side from the CPU 91 side.

[2] System Control

Next, referring to FIGS. 6–20, the control of the present system in the first embodiment of the present invention will be described.

Before describing flow charts, the terms "on edge" and "off edge" are defined. The "on edge" is defined to mean a condition change in which conditions of a switch, a sensor, a signal or the like changes from an off state to an on state. The "off edge" is defined to mean a condition change in which a state of a switch, a sensor, a signal or the like changes from an on state to an off state.

Processes on Copying Machine side

Figure 6:
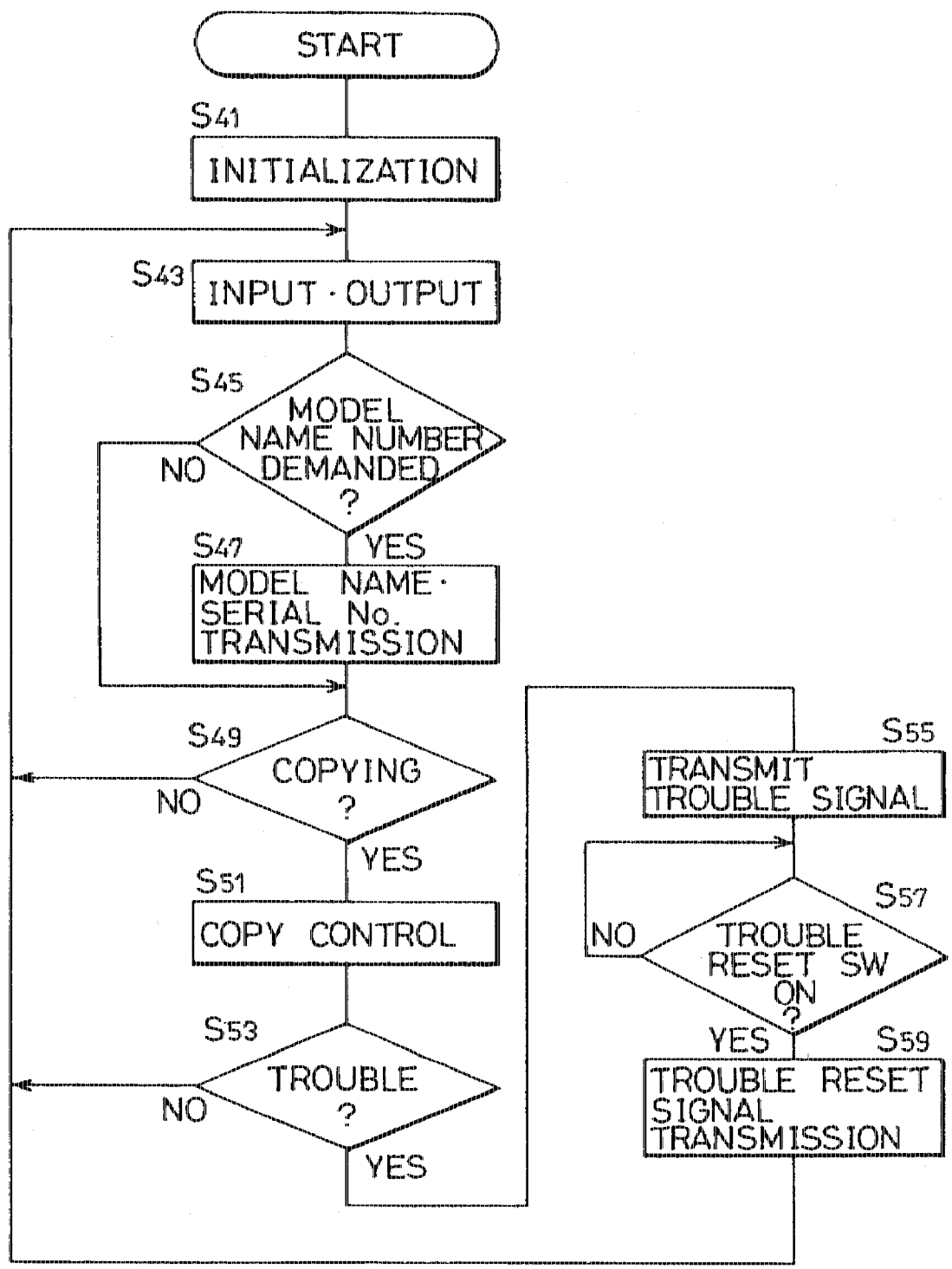
FIG. 6 is a flow chart showing processes by controlling CPU of the copying machine of FIG. 1.

First, the processes in control CPU 41 of a copying machine will be described referring to the flow chart of FIG. 6.

CPU 41, for example, starts processing upon turn-on of a power source, makes initialization such as memory clear, standard mode setting or the like (S41), and subsequently, carries out the processes in steps S43–S59.

Step S43 is a process for accepting data from a group of key switches on operation panel 40 (a group of ten keys 47 for numerical input, a print (PR) key 46 for copy start command, a clear key 48 for set number clear command, etc.), a group of switches such as a trouble reset switch 49 and a group of sensors provided in a copying machine, and data transmitted from the data terminal 1 side.

Step S47 is, when identification data of a copying machine (model name • serial number) is requested from CPU 11 of copying machine control apparatus (data terminal 1) (YES in S45), a process of reading the identification data from S-RAM 44 and transmitting the data to CPU 11 through serial I/F 42 • serial I/F 12.

Step S51 is a step collectively indicating control processes necessary in copying operation. For example, those are paper feed control, scan control, photoreceptor drum control, developing device control and so forth.

After step S53, the processes in the trouble occurrence are conducted. That is, when a JAM or other kinds of trouble occurs (YES in S53), a signal corresponding to the trouble is transmitted to controlling CPU 11 of data terminal 1 (S55). When trouble reset switch 49 is operated by an operator or the like (YES in S57), similarly to the above description, a trouble reset signal is transmitted to controlling CPU 11 of data terminal 1 (S59).

Processing in Data Terminal

Processes in controlling CPU 11 of a DT will be described referring to the flow charts shown in FIGS. 7–16.

(a) Main Routine

Figure 7:
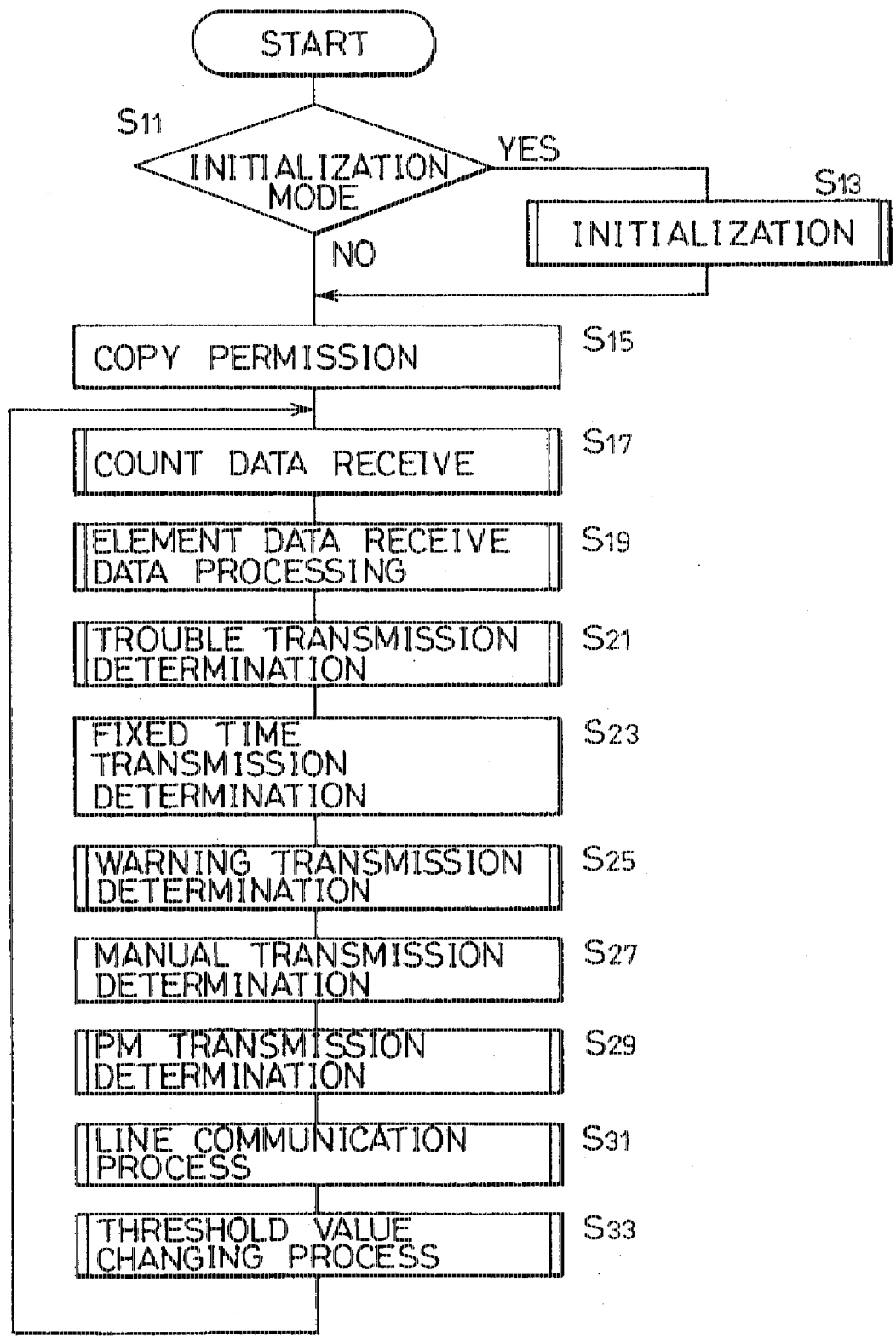
FIG. 7 is a flow chart showing a main routine of the data terminal of FIG. 1.

First, the outline of the processes will be described on the basis of the main routine of FIG. 7.

The controlling CPU 11 starts processing upon turn-on of a power source, carries out an initialization process as required (S13), and then transmits a copy permitting signal to controlling CPU 41 of a copying machine (S15). Subsequently, it proceeds to the repeated loop process of steps S17–S33.

Generally, the following processes are carried out in respective sub routine steps.

* Initialization: S13

Upon turn-on of the power source, when dip switch DIP•SW4 is ON, that is, it is in the initialization mode (YES in S11), it is executed. As will be described later, setting of a center selecting (telephone) number, a data terminal ID number (DTID) and a center ID number (center ID), obtaining of a model name • a serial number of a copying machine, and initialization transmission are carried out. Also, receipt of threshold value data and the like are conducted.

* Count Data receipt: S17

A receiving process of various kinds of count data transmitted from controlling CPU 41 of a copying machine is carried out.

The data contents include a discharge code, JAM and trouble codes, data of JAM and trouble counters, a counter for each paper size and a PM counter.

The controlling CPU 11 of a DT updates such data to the newest values and holds the same.

As will be described later, a total count value at the time of changing date (for example, 12:00a.m.) is held corresponding to each date.

* Element Data Receipt and Data Process: S19

As will be described later, data corresponding to an average value of each element data and a standard deviation are sequentially calculated to update them to the newest values.

* Trouble Transmission Determination: S21

As will be described later, a determination is made as to, for example, whether or not the trouble data and trouble recovery data should be transmitted to the center.

* Fixed Time Transmission Determination: S23

A fixed time transmission flag is set to 1 at a predetermined fixed time transmission time and various kinds of count data and various Of element data are transmitted to the center.

After completion of transmission by the fixed time transmission, fixed time transmission time data for the next time, current time data and data of the closing date of a bill are transmitted in turn from the center side.

* Warning Transmission Determination: S25

As will be described later, element data, a counted value of a JAM counter, and a counted value of a PM counter are compared with predetermined threshold values, respectively.

On the basis of the results thereof, a determination is made as to whether or not warning data, warning recovery data should be transmitted to the center.

Now, the above-mentioned predetermined threshold values are threshold values selected by a threshold value changing process described later.

* Manual Transmission Determination: S27

When it is not in the initialization mode, when push switch 21 is turned on, a manual transmission flag is set to 1.

By this, various count data, various element data are transmitted to the center.

* PM Transmission Determination: S29

As will be described later, a counted value before cleaning of a PM counter in which the counted value is cleared to "0" by parts replacement is transmitted to the center.

* Line Communication Process: S31

As will be described later, when any of transmission flags is set to "1", a communication terminal device on the center side is called. Also, after a connection is made with CPU 91 on the center side, data communication is performed.

* Threshold Value Changing Process: S33

As will be described later, threshold values providing permittable ranges of various kinds of element data and count data are selected according to the number of copies in the past thirty days.

(b) Sub Routine

Next, details of each sub routine step will be described referring to FIGS. 8A and 8B-14, in order.

Figure 8B:
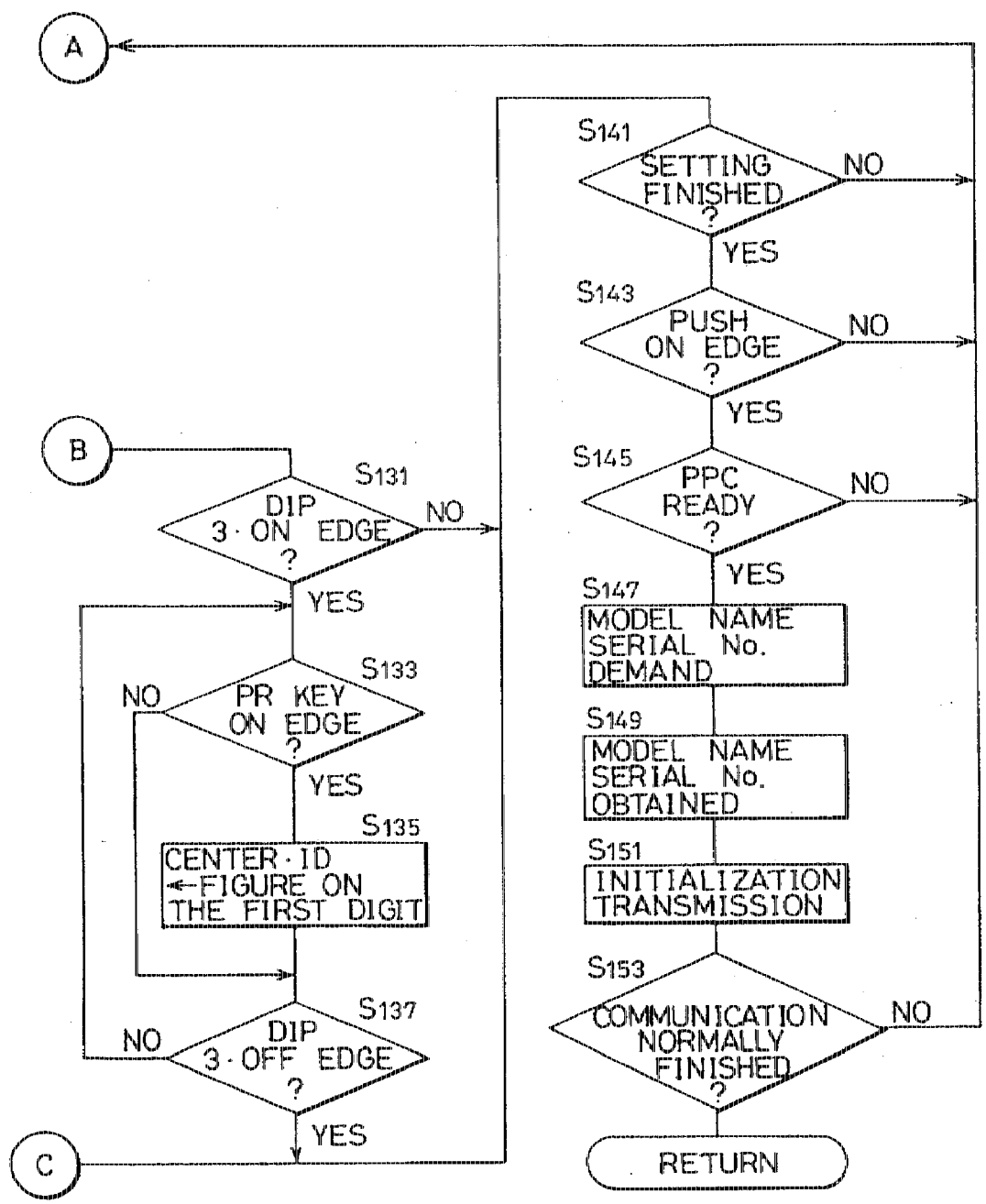

* Initialization Process (FIGS. 8A and 8B)

This process is executed when dip switch DIP•SW4 is ON in turn-on of a power supply (YES in S11). In this process, Accepting processes of initialization of the center selection number, the data terminal ID (DTID) and the center ID, acquisition of identification data of the connected copying machine (a model name • a serial number), and the initialization transmission are conducted.

First, memory 15 is initialized (S101), and ON of dip switches DIP•SW1-DIP•SW3 are stood by.

When DIP•SW1 is turned on (YES in S111), an input mode of the selection number (telephone number) is implemented. That is, a figure inputted with ten key 47 of the copying machine and displayed at the first digit of display portion 45 is stored in a nonvolatile memory 16 (S115) as selection number data of the center in response to input of print key 46 (YES in S113). The selection number input mode is released with OFF of DIP•SW1 (S117).

Similarly, in response to ON of DIP•SW2 (YES in S121), an input mode of DTID is set, and a figure displayed at the first digit of display portion 45 is stored in nonvolatile memory 16 (S125) as DTID data in response to input of print key 46 (YES in S123). The DTID input mode is released with OFF of DIP•SW2 (S127).

Similarly, in response to ON of DIP•SW3 (YES in S131), an input mode of the center ID is set and a figure displayed at the first digit of display portion 45 is stored in nonvolatile memory 16 as the center ID data (S135) for every input of print key 46 (YES in S133). The center ID input mode is released with OFF of DIP•SW3 (S137).

In this way, when three kinds of data setting have been finished all (YES in S141), ON/OFF of push switch 21 is made valid.

That is, when push switch 21 is depressed (YES in S143), on the condition of the ready on the connected copying machine (YES in S145), the identification data (the model name • the serial number) of that copying machine is demanded (S147).

When the identification data is transmitted from the copying machine in response to the demand (refer to FIG. 6, S47), after taking in the identification data from serial I/F. 12 (S149), the initialization transmission to the control center is made (S151). That is, after calling the control center, the above-mentioned two kinds of ID data, the identification data of that copying machine and the like are transmitted to CPU 91. After finishing the transmission, the data transmitted (the closing date of the count data, the next fix-time transmission time, the present time, and the threshold value of the warning determination) are received and stored from CPU 91 on the center.

As threshold values of the warning determination, in addition to a standard value (standard value 3), two threshold values (threshold value 2 and threshold value 1) changed according to the number of copies are received for each data. As an initial value of the threshold value, the standard value is selected first.

After finishing the receipt and transmission, a determination is made as to whether the communication has been made correctly or not (S153).

As a result, when it is not performed normally (NO in S153), it returns to step S111 to standby another ON of push switch 21.

When it has been conducted normally (YES in S153), it returns to the main routine to perform the processes after step S15.

Figure 9:
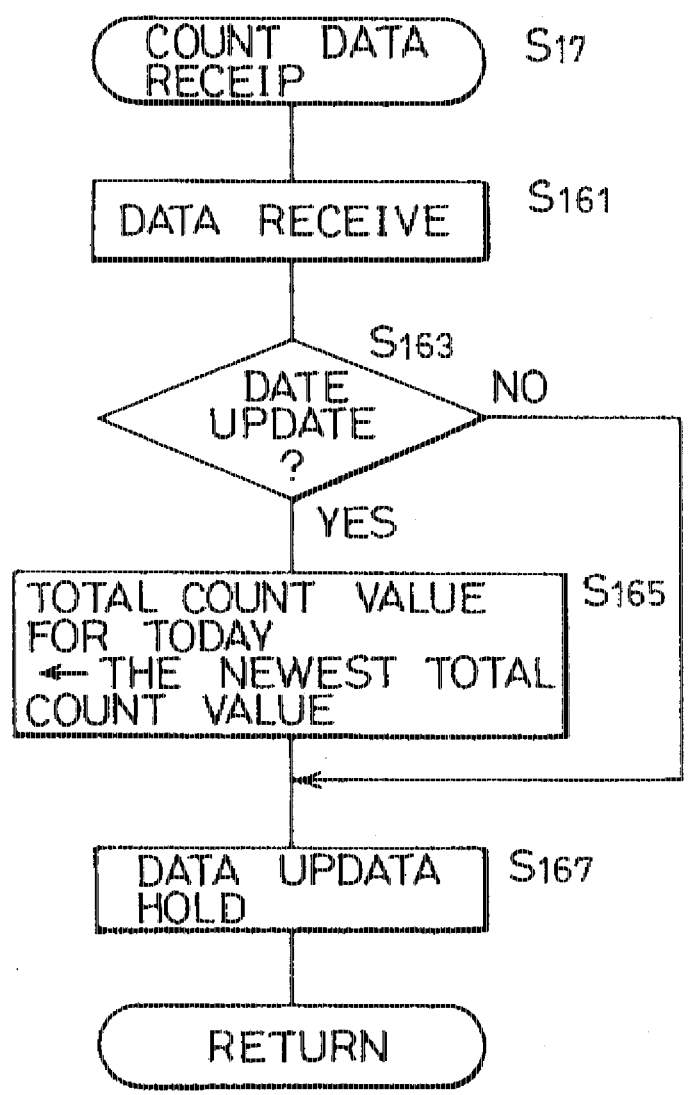
FIG. 9 is a flow chart showing specific contents of the count data receiving routine of FIG. 7.

* Count Data Receipt (FIG. 9)

First, various kinds of count data transmitted from copying machine 4 are taken in through serial I/F 12 (S161), and stored in corresponding memory areas (S167).

Also, at the timing of date changing (e.g., 12:00a.m.) (YES in S163), the value of the total counter indicating the total number of copies of the copying machine is stored corresponding to that date as a total count value of that date (S165).

Figure 10A:
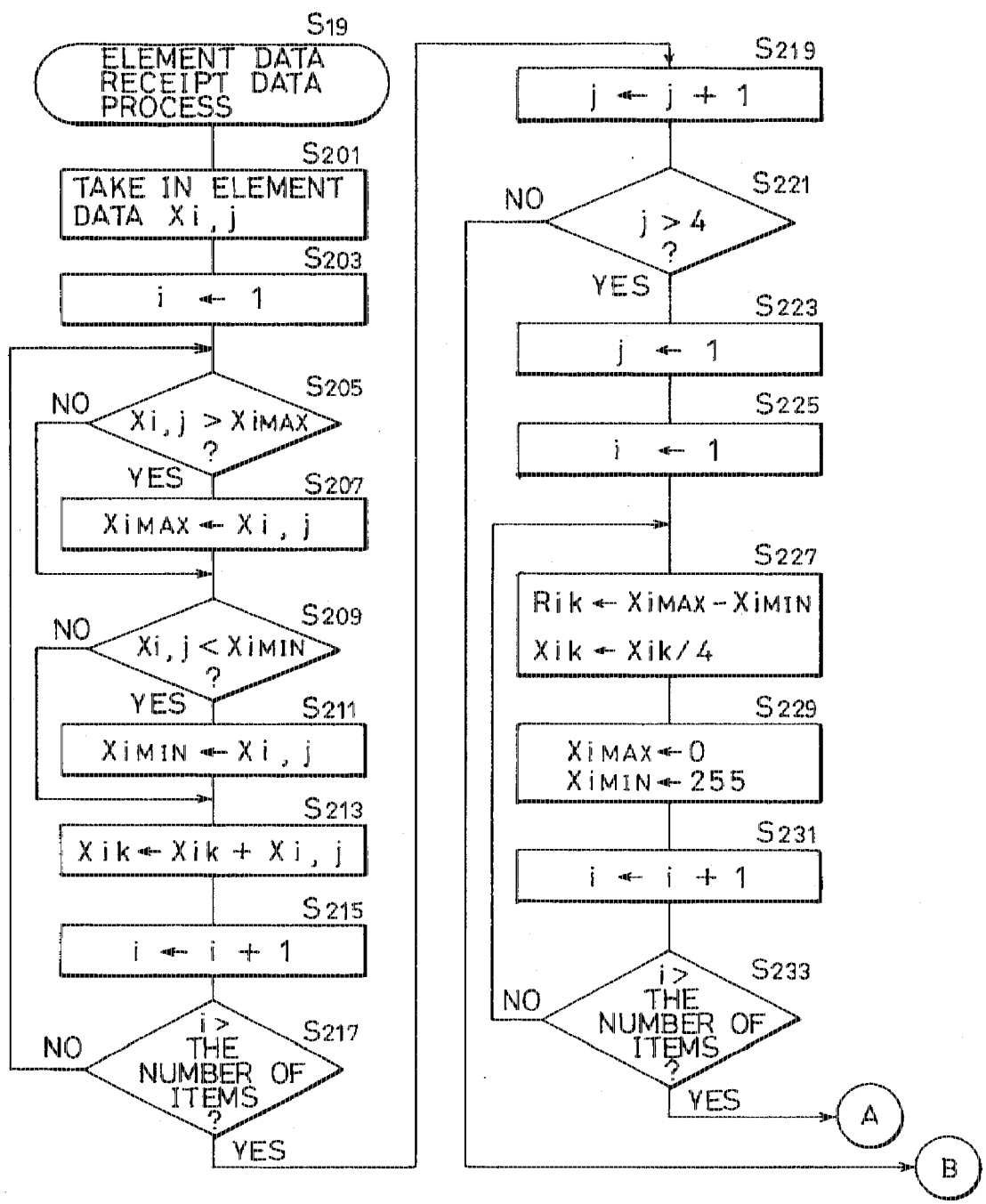
FIGS. 10A and 10B are flow charts showing specific contents of the element data receiving, data processing routine.
Figure 10B:
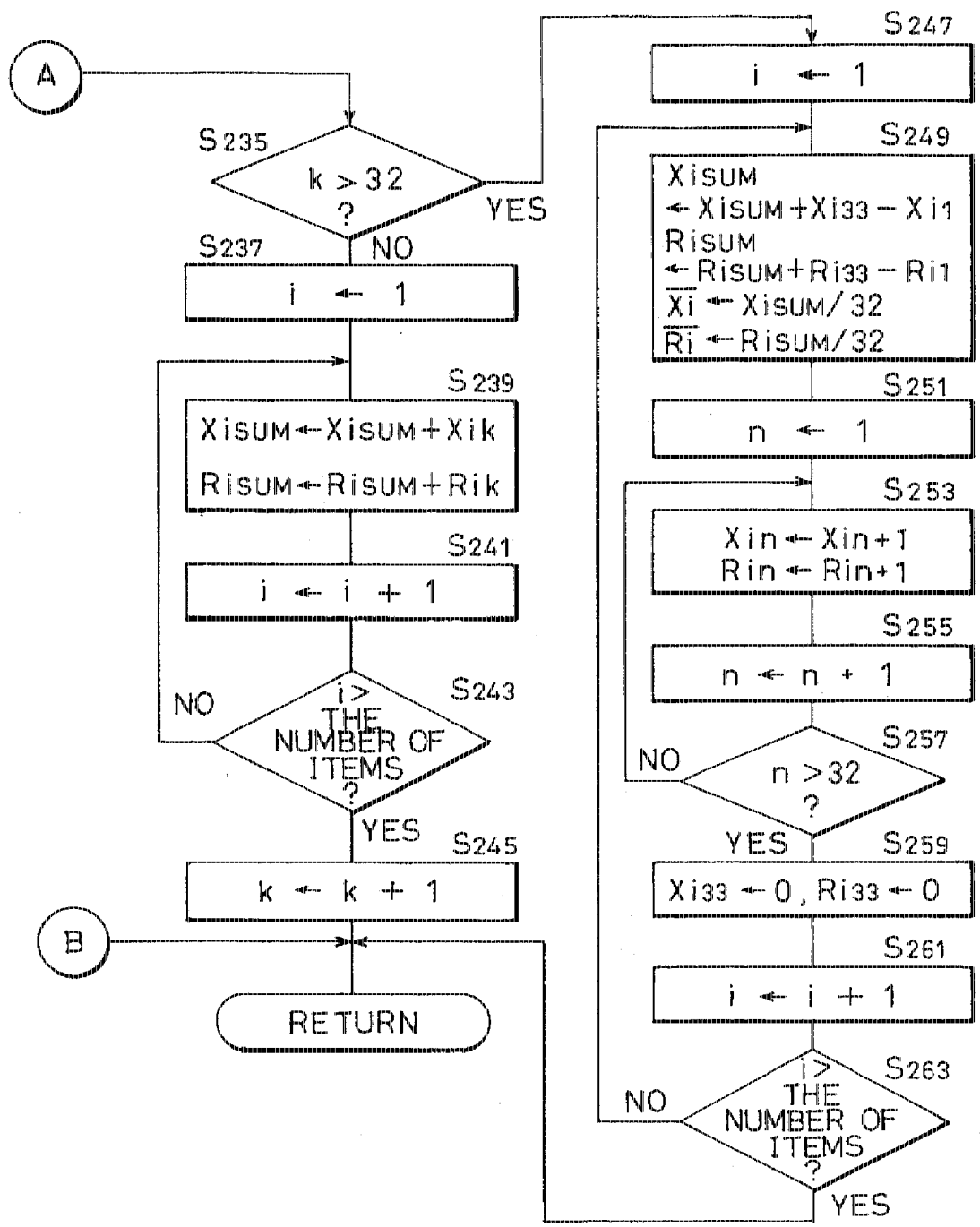

* Element Data Receipt, etc. (FIGS. 10A and 10B)

In this sub routine step, data for comparison with a threshold value (refer to the warning transmission determination; FIGS. 13A and 13B is calculated on the basis of the element data transmitted from a copying machine.

First, a group of element data $X_{i,j}$ transmitted from a copying machine for every discharge of copy paper are taken in from serial I/F13 (S201). Here, the subscript i expresses an item number of the element data and the subscript j expresses the order in each item.

Next, after substituting an initial value 1 for the item number i (S203), CPU 11 sequentially updates the maximum value $X_{iMAX}$, the minimum value $X_{iMIN}$ and a sum $X_{ik}$ for each item (S205-S217).

Subsequently, the subscript j is incremented (S219), and when j is 4 or less, the flow returns to the main routine.

In this way, when the processes of steps S201-S217 are carried out four times for each item (S221; YES), the subscript j is reset to 1 (S223), an initial value 1 is substituted into the item number i (S225), and the difference $R_{ik}$ between the maximum value and the minimum value and an average value $X_{ik}$ of four pieces of data are respectively calculated for each item (S227-S233). In step S229, initial values of the maximum value $X_{iMAX}$ and the minimum value $X_{iMIN}$ are given for preparation of processes in the next steps S205-S211.

After the processes of the above S227-S233, the processes of steps S237-S245, or of steps S247-S263 are carried out.

Steps S237-S245 are processes for a case in which the total of the processes of above S227-S233 does not reach thirty three times, wherein a sum $R_{iSUM}$ of the difference $R_{ik}$ between the above-mentioned maximum value and the minimum value and a sum $X_{iSUM}$ of the average value $X_{ik}$ of the above-mentioned four pieces of data are calculated for the data for thirty two times for each item.

Steps S247-S263 are processes for the case in which the total of processes in the above S227-S233 is thirty three times or more, wherein a sum $R_{iSUM}$ of the above difference $R_{ik}$ and a sum $X_{iSUM}$ of the above average value $X_{ik}$ are calculated for the newest data for thirty two times for each item, and also calculating average values $\overline{X_i}$ and $\overline{R_i}$, respectively.

As described above, an average value $\overline{X_i}$ of the newest 128 (=4×32) pieces of data and an average value of deviations (a value corresponding to the standard deviation) $\overline{R_i}$ are obtained for each item of the element data.

Figure 11:
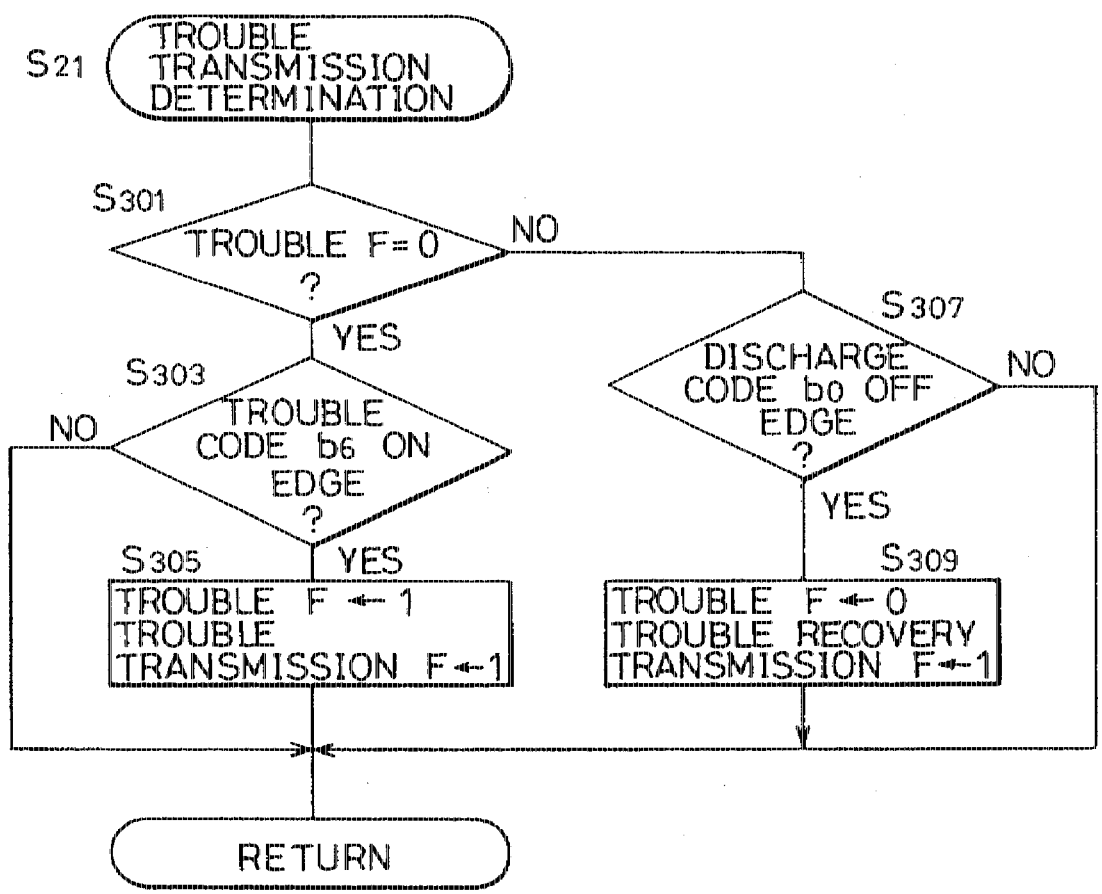
FIG. 11 is a flow chart showing specific contents of the trouble transmission determination routine of FIG. 7.
Figure 12:
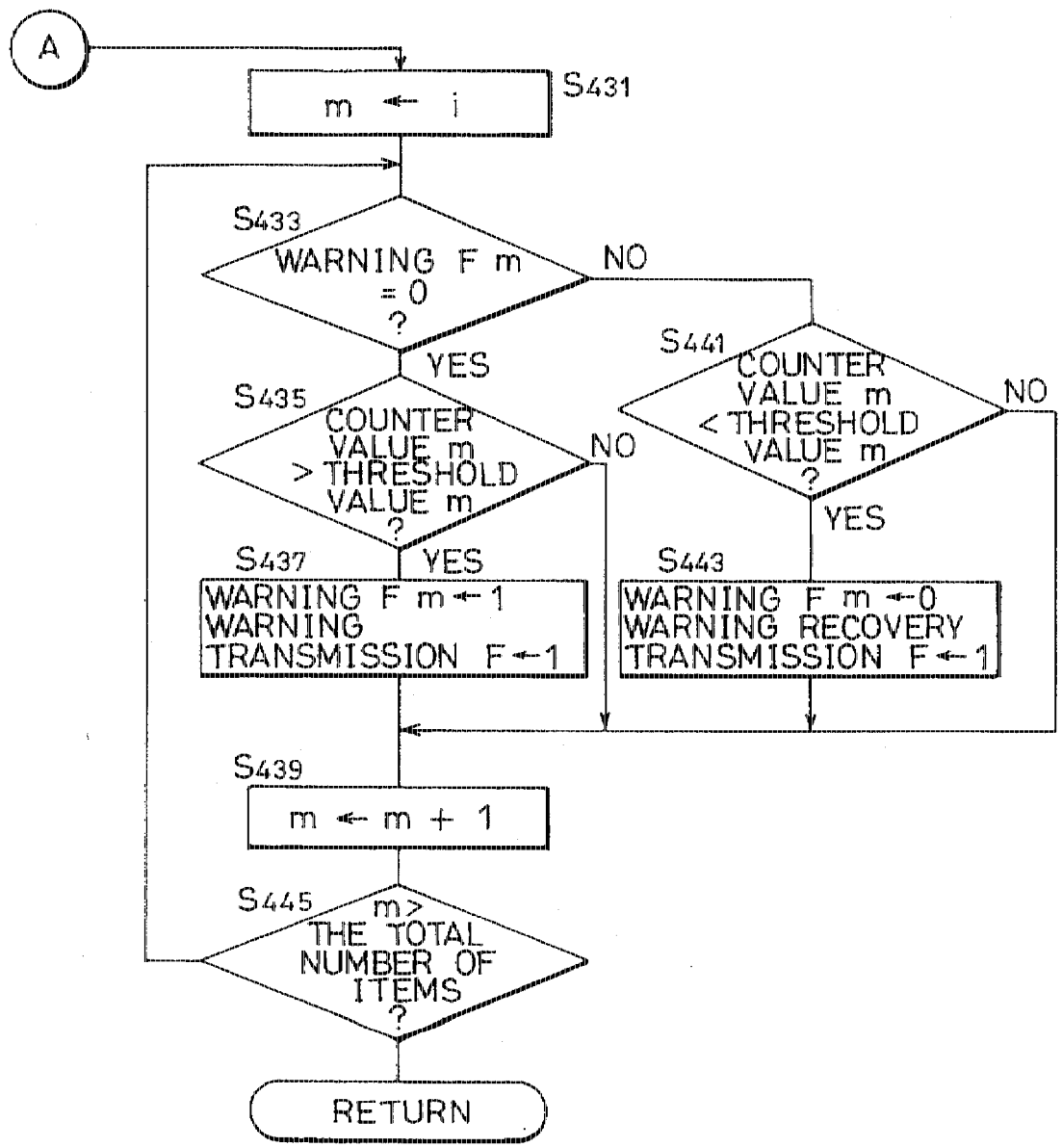
FIGS. 12A and 12B are flow charts showing specific contents of the warning transmission determination routine of FIG. 7.

* Trouble Transmission Determination (FIG. 11)

The process is a sub routine for controlling trouble transmission and trouble recovery transmission.

That is, when "trouble flag=0" (YES in S301), if a trouble code is detected from a copying machine (YES in S303), the trouble flag and a trouble transmission flag are set to "1", respectively (S305).

In a condition of "trouble flag=1" (NO in S301), when a paper discharge code from a copying machine is detected (YES in S307), the trouble flag is reset to "0", and a trouble recovery transmission flag is set to "1" (S309). This is because the paper discharge in a copying machine is an operation to be performed after a trouble is recovered.

Upon setting of the trouble transmission flag and the trouble recovery transmission flag, a line communication process (FIGS. 15A and 15B) is carried out and trouble data and trouble recovery data are transmitted to the center, respectively.

* Warning Transmission Determination (FIGS. 12A and 12B)

This process is a sub routine for controlling the warning transmission and the warning recovery transmission.

Steps S401–S427 are processes for performing the warning transmission when a value of element data gets out of the permittable range peculiar to that element data and the warning recovery transmission when it comes back into the permittable range, respectively.

As the peculiar permittable range, a standard value is normally set for each element data, but if the number of copies in the past 30 days exceeds a predetermined value, a permittable range narrower than the usual one is set.

First, an initial value "1" is set in the item number i indicating a type of the element data (S401).

Next, in step S411, a warning flag about objective element data (in the first time, the first element data) is examined.

As the result, when the warning flag about the particular element data is "0" (YES in S411), a determination is made as to whether or not the element data value is in the permittable range peculiar to the element data, in other words, whether or not it is in the range not more than an upper limit threshold value $_{iU}$ and not less than a lower limit threshold value $_{iL}$. When it is out of the permittable range (YES in S413 or YES in S415), a warning flag $F_i$ about the particular element data and a warning transmission flag are set to "1", respectively (S417). By this, the line communication process (FIG. 13) is carried out and warning data is transmitted to the center.

On the other hand, when a warning flag of the objective element data is "1" (NO in S411), a determination is made as to whether the value of the element data has recovered into the above-mentioned permittable range or not. If it has recovered (YES in S421 and YES in S423), a warning flag $F_i$ about the particular element data is reset to "0", and the warning recovery transmission flag is set to "1". By this, the line communication process (FIGS. 14A and 14B) is carried out, and warning recovery data is transmitted to the center.

After performing such processes until i attains the number of items of the element data, in other words, after performing the processes with respect to all the element data, the flow proceeds to the processes after step S431.

Steps S431–S445 are processes for making warning transmission when count values (frequency) of the JAM counter and the PM counter exceed peculiar threshold values, and warning recovery transmission when they recover below the threshold values, respectively. A standard value is normally set for each count data as a peculiar threshold value, but when the number of copies in the past 30 days exceeds a predetermined value, a threshold value lower than the normal one is selected to narrow the permittable range than the normal one.

First, an initial value "i (the last number of the element data+1)" is set in the item number m indicating types of a JAM counter and a PM counter (S431).

Next, in step S433, a warning flag about the objective JAM counter or PM counter is examined.

As a result, when the warning flag about the particular JAM counter or PM counter is "0" (YES in S433), a determination is made as to whether or not the value of the counter is in a permittable range peculiar to the counter, that is, whether it exceeds the threshold value $_m$ or not. When it exceeds the same (YES in S435), the warning flag $F_m$ and the warning transmission flag about the particular counter are set to "1", respectively (S437). By this, the line communication process (FIGS. 15A and 15B) is carried out and warning data is transmitted to the center.

On the other hand, when a warning flag about the objective JAM counter or PM counter is "1" in the abovementioned S433 (NO in S433), a determination is made as to whether the value of the particular counter has been recovered below the above threshold value or not. In the case of recovery (YES in S441), the warning flag $F_m$ about the particular counter is reset to "0", and the warning recovery transmission flag is set to "1". By this, the line communication process (FIGS. 15A and 15B) is carried out and the warning recovery data are transmitted to the center.

CPU 11 performs such processes until m attains the total number of items of element data and counters, in other words, after performing with respect to all the counters, it returns to the main routine.

As described above, the warning transmission and the warning recovery transmission are controlled.

Figure 13:
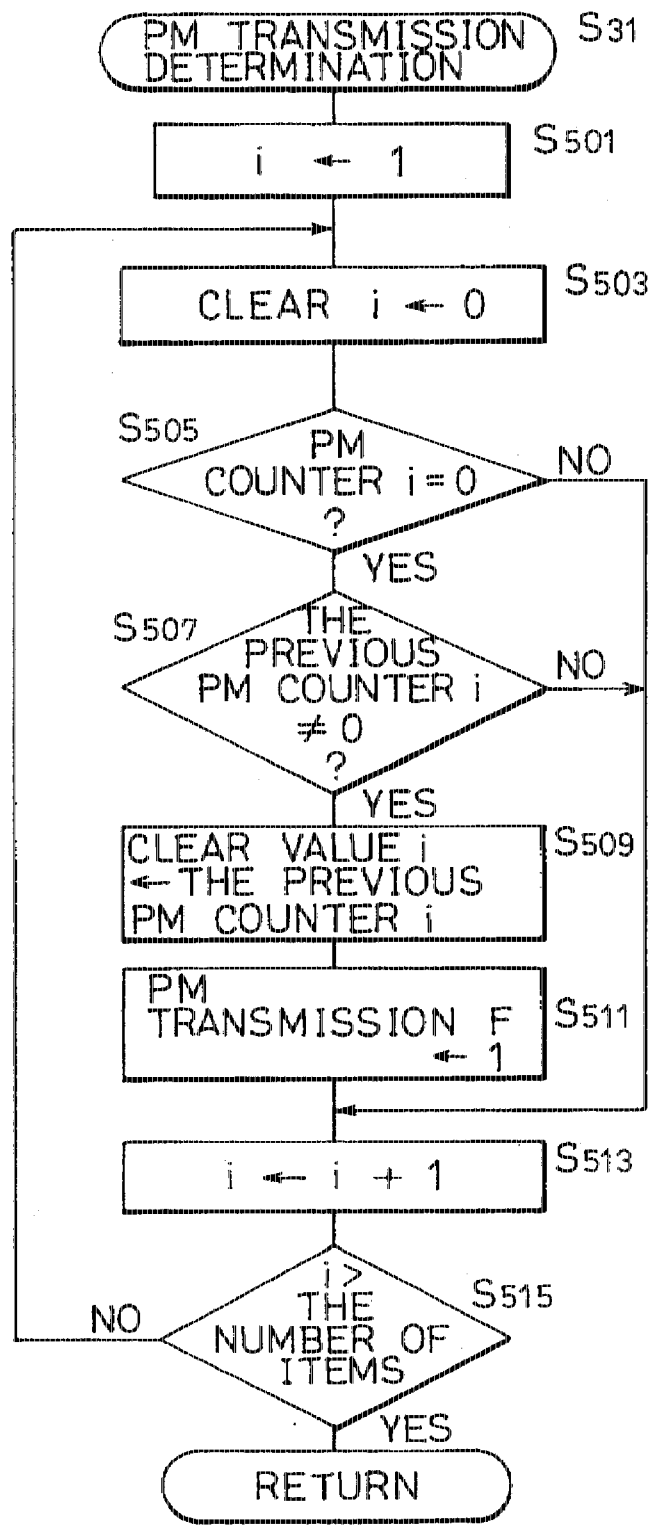
FIG. 13 is a flow chart showing specific contents of the PM transmission determination routine of FIG. 7.

* PM Transmission Determination (FIG. 13)

In this process, the PM transmission is controlled.

First, an item number i indicating a type of a PM counter is set to an initial value "1" (S501), and after the processes in steps S503–S511 are carried out, the value of i is incremented, that is, changing a type of PM counter, the above processes are repeated.

Here, the processes in the above S503–S511 are processes for retaining a count value immediately before clearing the PM Counter (S509) and setting the PM transmission flag to "1" (S511) when the PM counter is cleared (YES in S505 and YES in S507). A PM counter is cleared by a serviceman when replacing parts corresponding to the PM counter.

When "PM transmission flag=1", the line communication process (FIGS. 15A and 15B) is carried out, and the PM data (types of replaced parts, a count value immediately before the replacement) are transmitted to the center.

Figure 15:
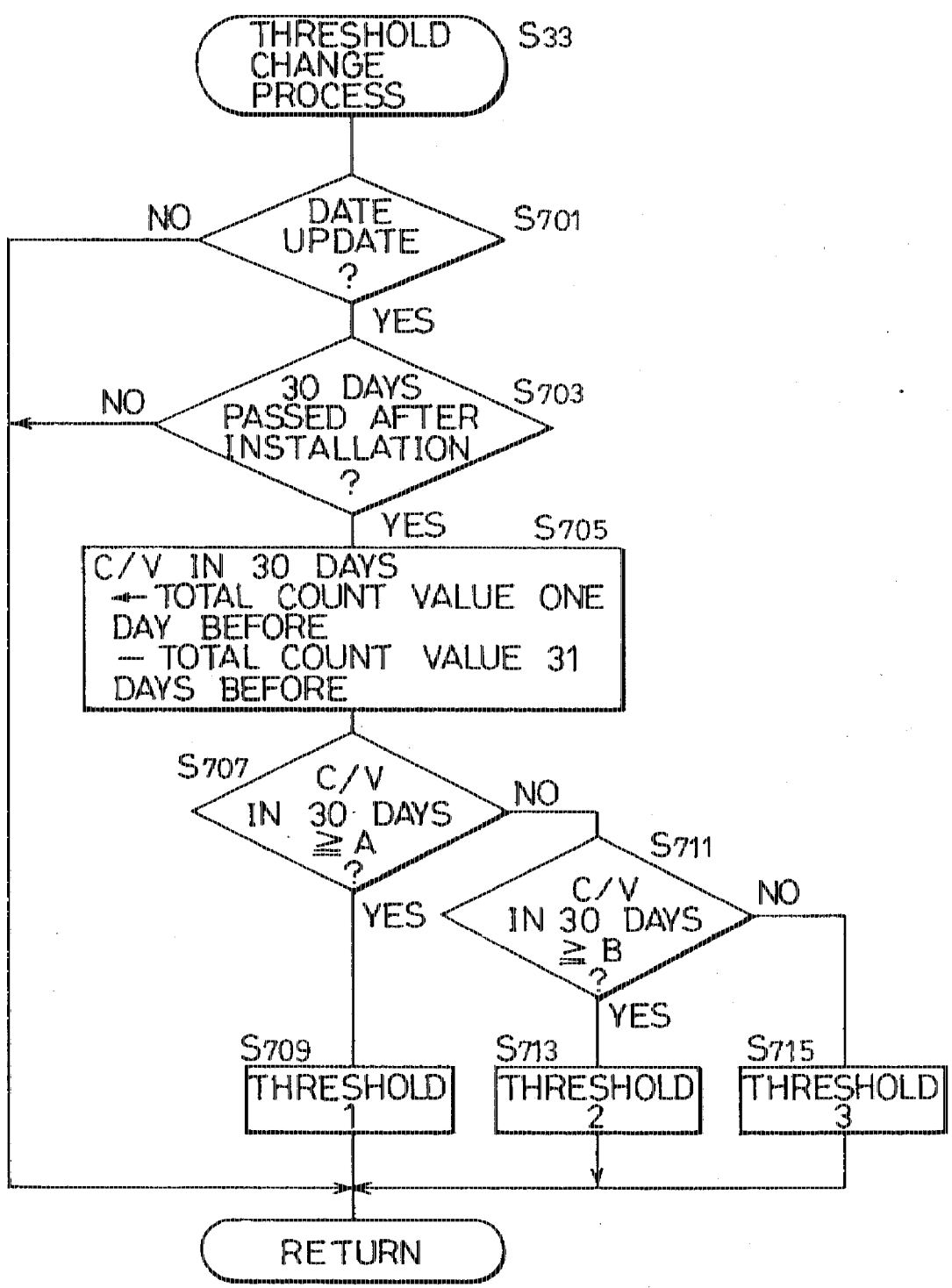
FIG. 15 is a flow chart showing specific contents of the threshold value changing process routine of FIG. 7.
Figure 16:
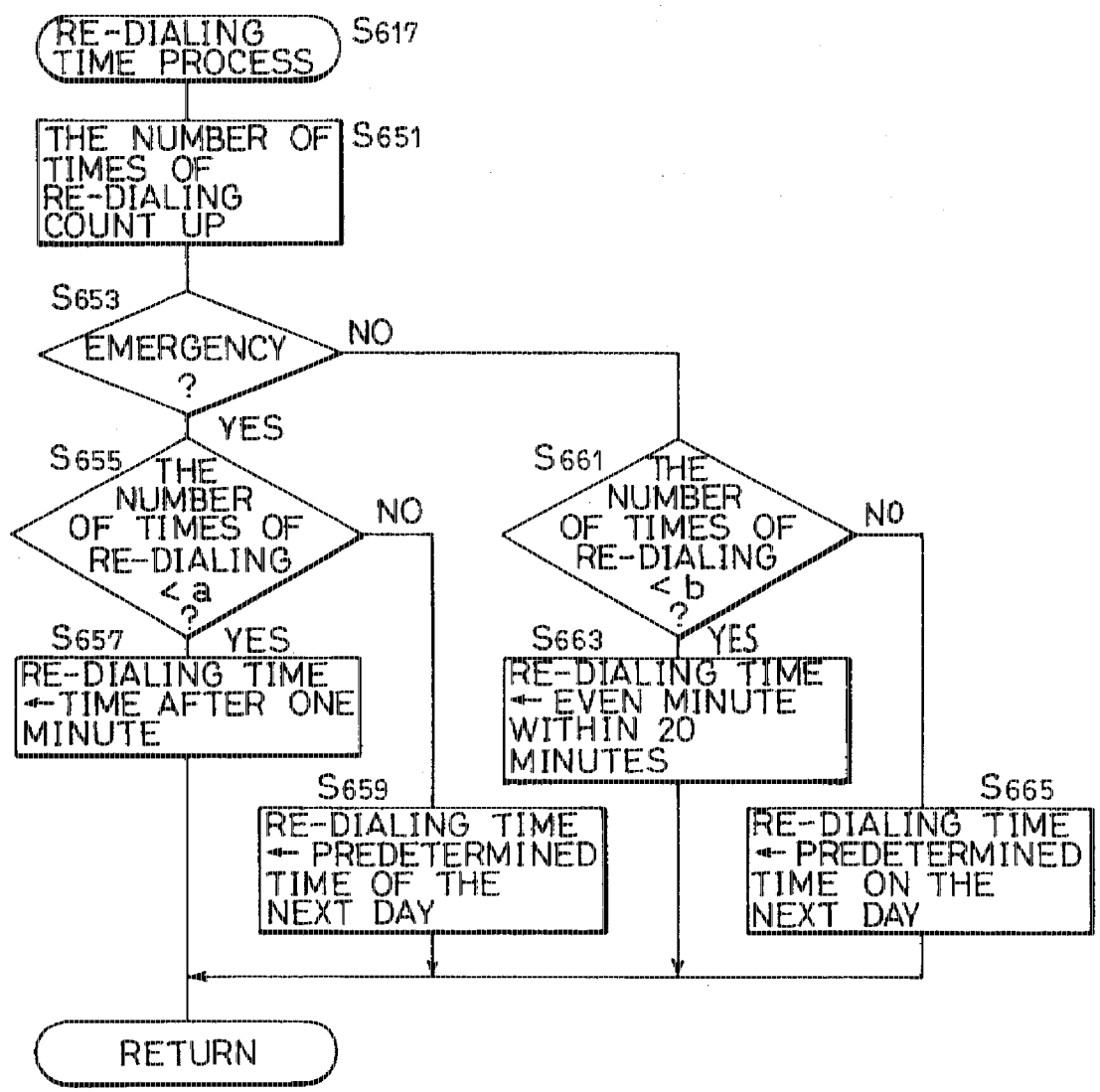
FIG. 16 is a flow chart showing specific contents of the re-dial time process routine of FIG. 14B.

* Threshold Value Changing Process (FIG. 15)

In this sub routine, a threshold value for use in the warning transmission determination is selected out of three threshold values. Here, first, as described above, a standard value (threshold value 3) is selected in the initialization process.

First, a determination is made as to whether or not the date has been updated, that is, it is 12:00a.m. (S701).

When it has been updated (YES in S701), a determination is made as to whether or not 30 days have passed after that copying machine control device was provided, and when 30 days have not passed (NO in S703), this sub routine is substantially jumped and it returns to the main routine.

On the other hand, if 30 days have passed after the installation (YES in S703), the number of copies in the past 30 days is calculated. That is, the total count value of the date of 31 days before is subtracted from the total count value dated the day before, which is substituted into a variable indicating the number of copies for 30 days (C/V) (S705).

Next, according to the number of copies in the past 30 days, a threshold value is selected.

That is, if "the number of copies in the past 30 days<B" (NO in S711), the number of copies is in the normal range, no need of updating the threshold value, so the threshold value 3 is selected (S715).

If "B≦the number of copies in the past 30 days<A" (YES in S711), it means that the number of copies is larger than the standard quantity, so that the threshold value 2 is selected (S713) to somewhat narrow down the permittable range.

If "A≦the number of copies in the past 30 days" (YES in S707), since the number of copies is extremely larger than the standard quantity, the threshold value 1 is selected (S709) to sufficiently narrow down the permittable range.

As described above, according to the total number of copies in the past thirty days (the frequency of use of the copying machine), a threshold value for the warning determination is selected for each data.

In the above description, three threshold values are prepared for each data, which can be selected as a set (threshold value 1, threshold value 2, threshold value 3), but, for example, only a standard value may be prepared as a threshold value, which may be shifted by a predetermined value determined by a type of data corresponding to the frequency of use of the copying machine.

Figure 14A:
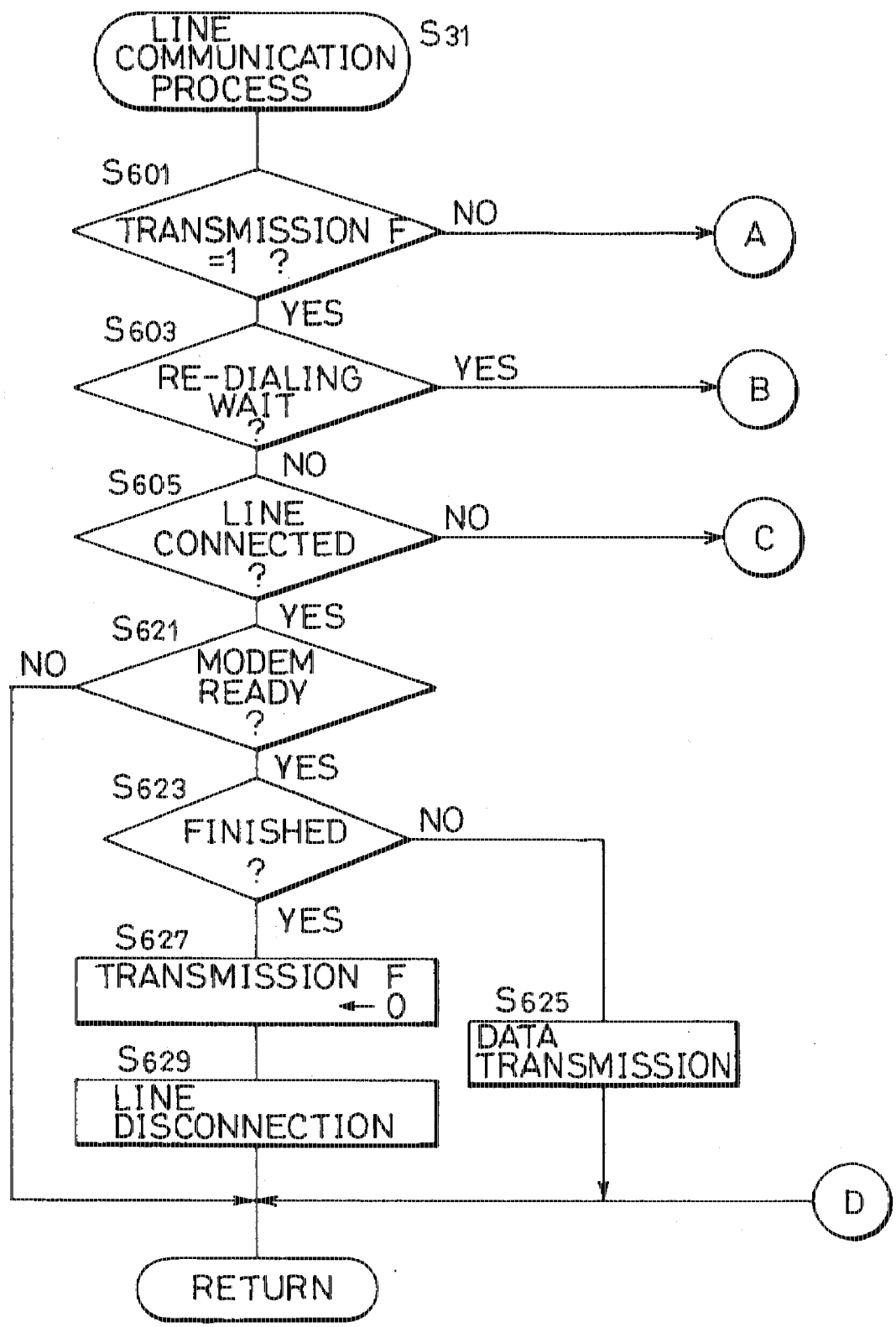
FIGS. 14A and 14B are flow charts showing specific contents of the line communication process routine of FIG. 7.
Figure 14B:
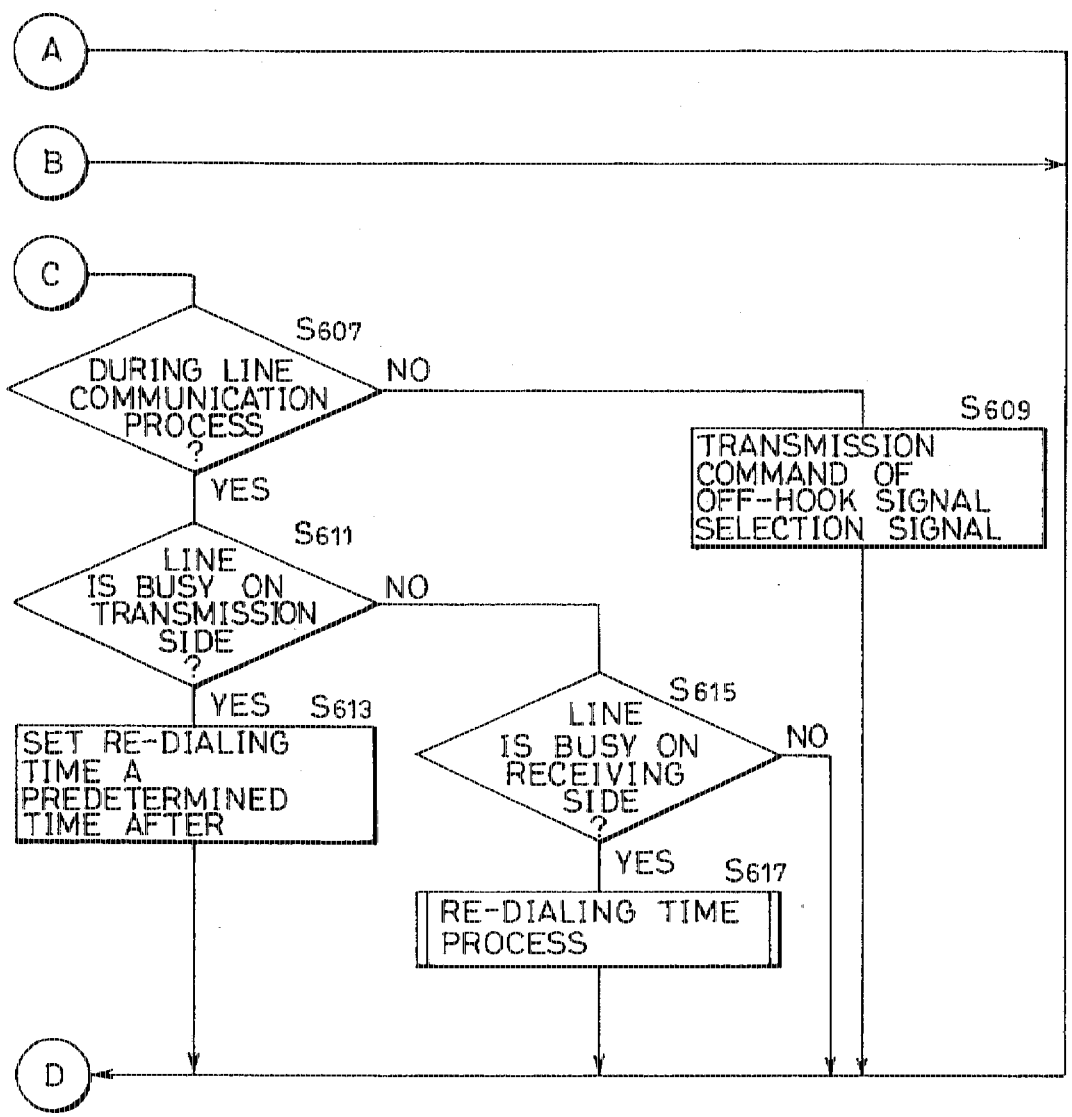

* Line Communication Process (FIGS. 14A and 14B)

In this process, the center is called corresponding to "any transmission flag=1", and data corresponding to that transmission flag is transmitted. In the initialization transmission (refer to FIG. 8B, S151), an initialization transmission flag is set to "1" to execute this line communication process.

First, when any of transmission flags is set to "1" (YES in S601), on conditions that it is not in the re-dial standby (NO in S603), the communication line is not connected to the center side modem 72 (NO in S605), and an OFF-hook signal and a selection signal are not transmitted to the communication line (NO in S607), modem 52 is commanded to transmit an OFF-hook signal and a selection signal to the communication line (S609).

By the process in step S609, the determination in the next step S607 becomes "YES". In this case, when telephone machine 53 at the user is "in use (the communication line is busy)", and modem 52 can not transmit an off-hook signal and a selection signal to the communication line accordingly (YES in S611), a time a predetermined time after is set as a re-dialing time (S613). By the process in the S613, the determination in S603 is "YES" until that re-dialing time is reached, so that the calling process for the center side modem 72 is not performed. When it comes to that re-dialing time, by NO in S603→NO in S605→NO in S607→S609, it is commanded to the modem 52 to transmit again an off-hook signal and a selection signal to the communication line.

By the process in the step S609, when it is determined that the center side modem 72 is "in use (the communication line on the center side is occupied)" as a result of transmission of the off-hook signal and the selection signal to the communication line (YES in S615), the re-dialing time process (FIG. 16, described later) is performed (S617). By this, the determination in step S603 remains "YES" until the time set in that re-dialing time process, and the calling process for the center side modem 72 is not performed. At the time set in that process, the center side modem 72 is called again.

On the other hand, by the process in that step S609, an off-hook signal and a selection signal are transmitted from modem 52 to the communication line. When the communication line is connected to the center side modem 72 as a result (Yes in S605), the transmittable condition by the data transmission permission from the center side is stood by, and when it comes to the transmittable condition (YES in S621), the data is transmitted to the center side (S625). Data transmitted in that step S625 is data defined by a transmission flag set to "1". For example, in the initialization transmission, together with DTID and the like, the identification data (a model name • a serial number) of the connected copying machine is transmitted.

In this way, when all the data are transmitted (YES in S623), the transmission flag is reset to "0" (S627), and also a line disconnection signal is transmitted to the communication line to disconnect the communication line with the center side modem 72 (S629).

Next, the re-dialing time process (FIG. 16, S617) will be described.

The re-dialing time process is a process for setting the re-transmission (re-dialing) time if a connection with center side CPU 91 could not be made (YES in S615).

First, a counter for counting the number of times of redialing (a redial counter) is counted up (S651). The counter is cleared after connection with the center.

Next, a determination is made as to whether the present dialing is a dialing in an emergency mode (in the case of trouble transmission) or not, and if it is the emergency mode (YES in S653), on the condition that a redial counter value is less than a (=about 10–20 times) (YES in S655), the time one minute after the present time is set as the next redialing time (S657). That is, in the case of the emergency mode, the center is called for every minute until the number of times of redialing reaches "a" times.

When the number of times of redialing in the emergency mode reaches a (NO in S655), a predetermined time in the next day is set as a redialing time (S659). The redialing time is set in the next day in order to avoid occupying a telephone of a user when connection to the center can not be made in spite of dialing for "a" times (abnormally busy network condition, operation stop of the center side CPU91 and so forth are possible).

On the other hand, when it is determined that it is not in the emergency mode in the S653 (NO in S653), on the condition that the redial counter value is less than b (YES in S661), an arbitrary even minute time within twenty minutes from the present time is set as the next redialing time on the basis of a random number (S663). This is done in order to increase the possibility of connecting to the center by dispersing redialing times of respective DTs even when dialing to the center from a large number of DTs are made.

When the number of times of redialing in the nonemergency mode attains b or more (NO in S661), a predetermined time in the next day is set as the next redialing time (S665). This is done in order to avoid occupying a telephone of a user when connection to the center can not be made in spite of dialing to the center for b times (abnormally busy network, operational stop of the center side CPU91 and so forth are possible).

The line communication process is carried out as described above, and the data is transmitted to the center, and data from the center is received as needed.

Processes at the Center

Next, the processes in CPU 91 provided in the computer at the center will be described referring to FIGS. 17–20.

Figure 17:
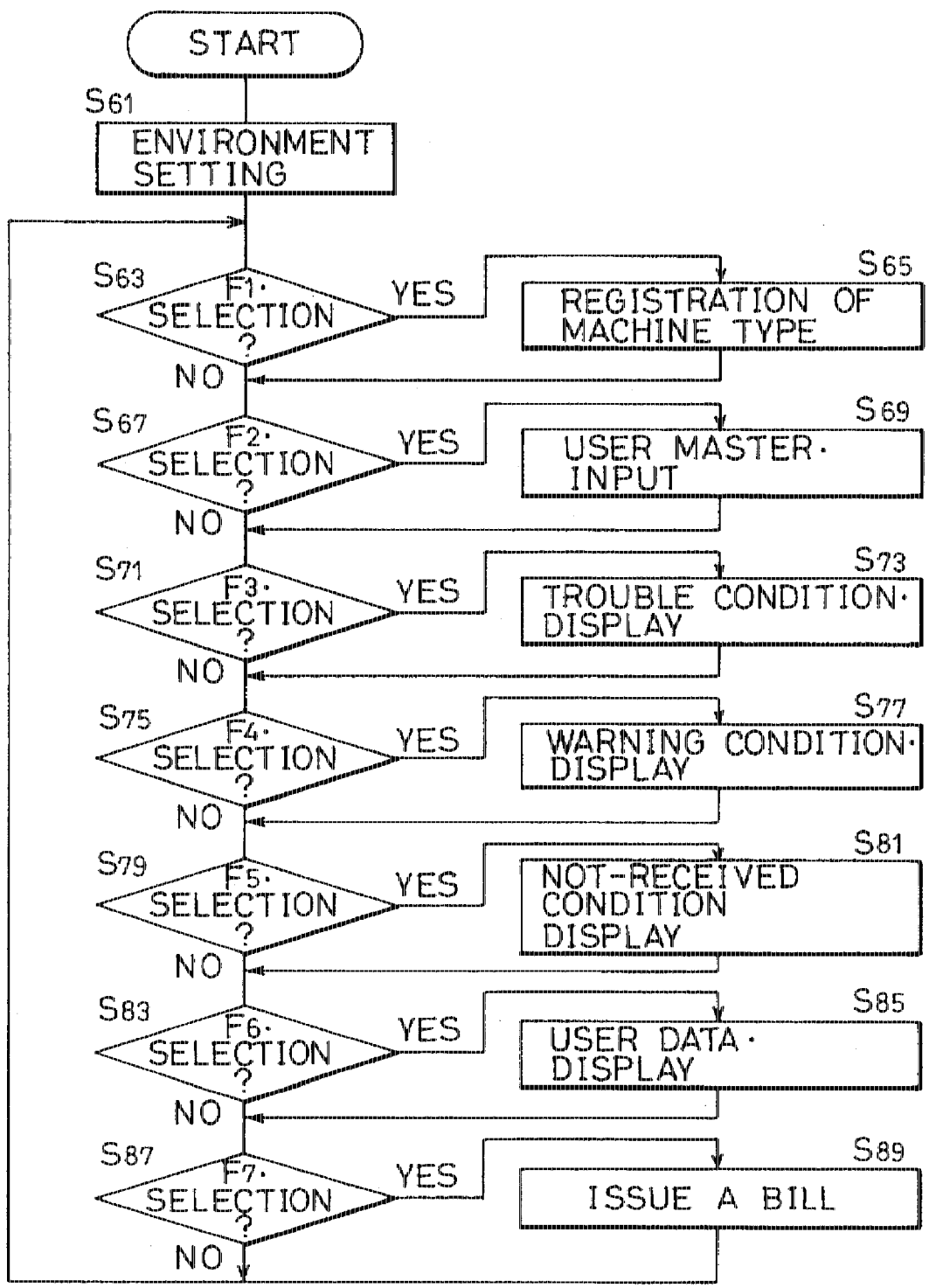
FIG. 17 is a flow chart showing a main portion of the main routine of the controlling CPU on the center side of FIG. 1.

(a) F1–F7 key processes (FIG. 17)

CPU 91 starts processing upon connection of a power source, and performs environment setting of a modem, a printer and the like (S61). Subsequently, in response to input operation of each key F1–F7 on keyboard 93, the following modes are set or the following processes are executed.

F1 key operation (YES in S63)

An acceptance mode of machine type registration is set (S65). That is, new registration of machine type name, the number of items of element data, a name of each element data, a threshold value of each element data, a threshold value of each count data, etc. are accepted.

F2 key operation (YES in S67)

A registration acceptance mode of a user master is set (S69). That is, new registration of a name of user, address, telephone number, machine type name, data and time of fixed time transmission, etc. are accepted.

F3 key operation (YES in S71)

The trouble conditions are displayed (S73). That is, user information (a name of the user, address, telephone number, a machine type name) of a copying machine of trouble transmission, date and hour of occurrence and so forth are displayed in display 92 together with contents of the trouble. The number of trouble cases is always displayed in a corner portion of display 92 without any connection with operation of F3 key.

F4 key operation (YES in S75)

A warning condition is displayed (S77). That is, user information and so forth of a copying machine of the warning transmission are displayed in display 92 together with the contents of the warning. The number of warning cases is always displayed in a corner portion of display 92 without any connection with operation of the F4 key.

F5 key operation (YES in S79)

A not-received condition is displayed (S81). That is, user information of a copying machine which does not make fixed time transmission even after a predetermined fixed time transmission time is displayed in display 92. The number of no receipt cases is always displayed in a corner portion of display 92 without any connection with operation of the F4 key.

F6 key operation (YES in S83)

A display mode for user data is implemented (S85). That is, when a user is selected, user information is displayed in display 92. Also, if a sub menu is selected, count values of various counters of the copying machine of the particular user (a total counter, a counter for each paper size, a JAM counter, a trouble counter, a PM counter) and element data are displayed for every month or for every item.

F7 key operation (YES in S87)

A bill is printed out (S89). For example, an amount asked is calculated on the basis of a count value of the total counter and a predetermined calculation expression, and printer 94 is activated to print it out.

Figure 18:
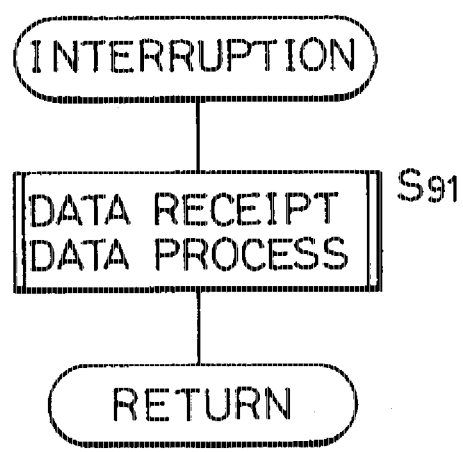
FIG. 18 is a flow chart showing an interruption process in the controlling CPU on the center side of FIG. 1.
Figure 19:
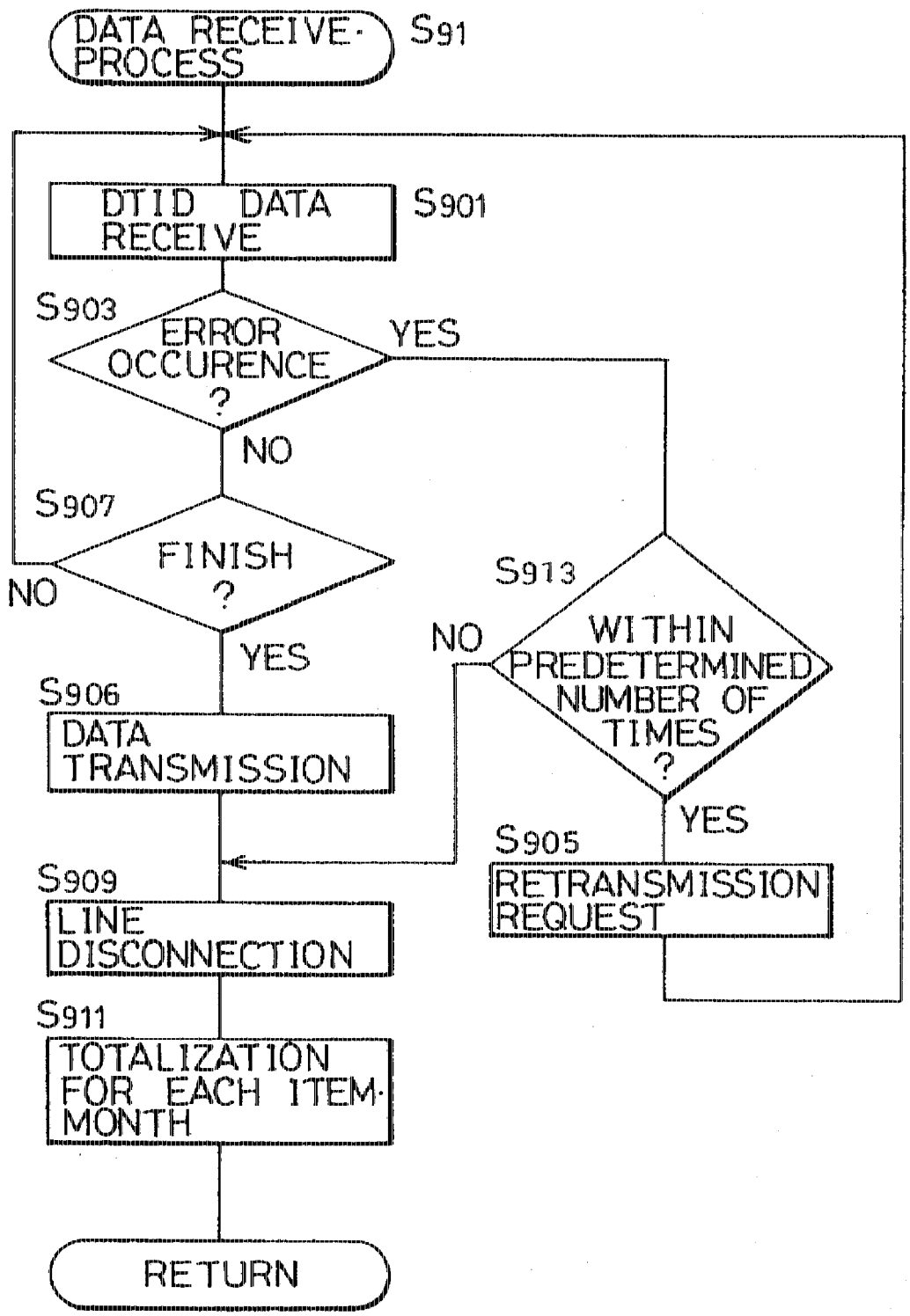
FIG. 19 is a flow chart showing specific contents of the data receiving • data processing routine of FIG. 18.

(b) Interruption Process (FIGS. 18 and 20)

CPU 91 receives data transmitted from a DT by an interruption process, and also applies a predetermined process to the received data (S91).

First, when an interruption is produced due to the reception from the communication line, the data transmitted from the data terminal side is received (S901). As data, in addition to the DTID, the identification data of the copying machine (the model name • the serial number) and the like are received in the initialization transmission time, for example. The received identification data is stored for each user as shown in FIG. 20 in control data areas of the S-RAM 95 together with the DTID.

When a communication error occurs (YES in S903), on condition that the number of the error occurrence is a predetermined number of times or less (YES in S913), retransmission of data such as DTID and the like is requested to the data terminal side (S905).

If the number of times of the error occurrence exceeds the predetermined time (NO in S913), the communication line with the data terminal is disconnected (S909).

When communication with the data terminal has normally finished (YES in S907), data (the closing date of the count data, the next fixed time transmission time, the present time, the warning determination threshold value, etc.) is transmitted to the data terminal (S906).

As a threshold value of the warning determination, other than a standard value (threshold value 3), two threshold values (threshold value 2, threshold value 1) changed corresponding to the number of copies are transmitted for each data, respectively.

Then, after disconnecting the communication line to the data terminal (S909), totalization is made for each item and month to produce data for screen display by the operator selection (S911).

As described above, processes in CPU 41 in a copying machine, CPU 11 in a data terminal, and CPU 91 in the center are done, and present system in which each user and the center which is a management party are connected by the communication line is controlled.

As described above, in the first embodiment, after attaching a copying machine control device to a copying machine, identification data of that copying machine is read out to be transmitted to a centralized control unit as initial data, and stored corresponding to identification data of the copying machine control device (ID) in the centralized control unit.

According to the first embodiment, data of a copying machine and a control device of that copying machine are stored in a centralized control unit corresponding to each other when providing the copying machine control device. Accordingly, in the centralized control unit, the copying machine which is objective to the control can be correctly recognized to be controlled.

Also, in providing copying machine control devices, detailed cares conventionally required (cares not for erroneously recognizing a copying machine objective to the installation) do not have to be taken.

Next, the second embodiment of the present invention will be described.

In this second embodiment, the identification data (the model name, the serial number) stored in copying machines are not transmitted to the center as the above-described first embodiment, but the identification data of a copying machine to which a data terminal will be connected is stored at the center. Then, when the data terminal is connected to the copying machine, if the identification data stored in the copying machine and the identification data stored in the data terminal do not match each other, a warning is made. The above-described first embodiment and the second embodiment are different in some parts of the configuration of operation portion of data terminals, processes of CPU 11 of the data terminal and the processes of a CPU 91 of the center. The second embodiment will be described specifically referring to FIG. 21 replacing FIG. 3 of the first embodiment, FIG. 22 replacing FIG. 7, FIG. 23 replacing FIG. 8, FIGS. 25A and 25B replacing FIG. 17 and also FIGS. 24 (the operation determination sub routine) and 26 (the DT initialization sub routine) newly added.

Other figures are shared by the first and second embodiments, so that the description thereof is not repeated here.

Figure 21:
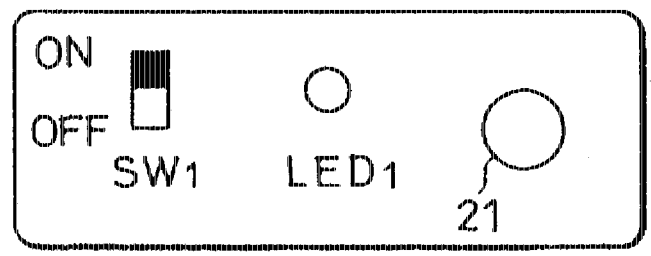
FIG. 21 is a diagram for describing operation switches in the second embodiment of the present invention.

Initialization setting is applied to a data terminal 1 before shipping. That is, a dip switch DIPSW1 in the operation portion (FIG. 19) is turned on so that a CPU 11 of the data terminal and a CPU 91 at the center are connected through the communication interface (RS232CI/F) 18 on the CPU 11 side and the communication interface (RS232CI/F) 98 on the CPU 91 side to receive data from CPU 91 side, and the initial information such as the identification data of the copying machine is stored in the data terminal (refer to FIG. 23, S105). In FIG. 21, an LED 1 is an LED element for displaying a warning by going on and off in case where a copying machine which is connected to the data terminal after shipping is a different one from an objective copying machine.

Figure 22:
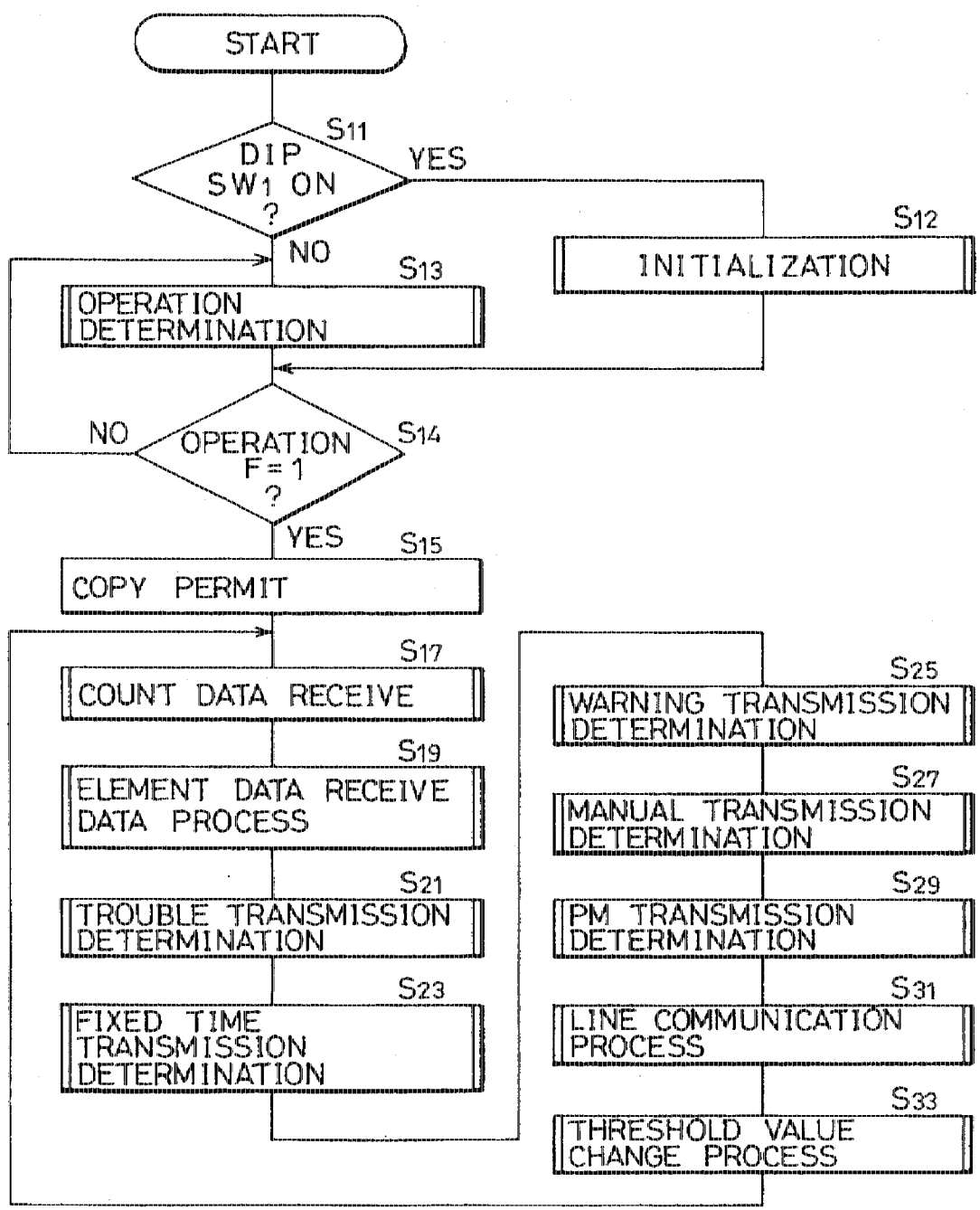
FIG. 22 is a flow chart showing contents of the main routine of the controlling CPU of a data terminal according to the second embodiment of the present invention.

The main routine of CPU 11 of DT1 in the second embodiment is shown in FIG. 22.

The controlling CPU 11 starts processing upon turn-on of a power supply, for example.

When dip switch DIPSW1 is ON when the power supply is turned on (YES in S11), the initialization process (S12) is carried out.

On the other hand, if dip switch DIPSW1 is OFF when the power supply is turned on (NO in S11), the operation determination process (S13) is conducted and furthermore, if an operation flag is set to 1 (YES in S14), a copy permission signal is transmitted to controlling CPU 41 of the copying machine (S15). Subsequently, it shifts to the repeating loop process of steps S17–S33.

Regarding to steps S17–S33, since they are the same as those in the first embodiment, the description thereof is not repeated.

Figure 23:
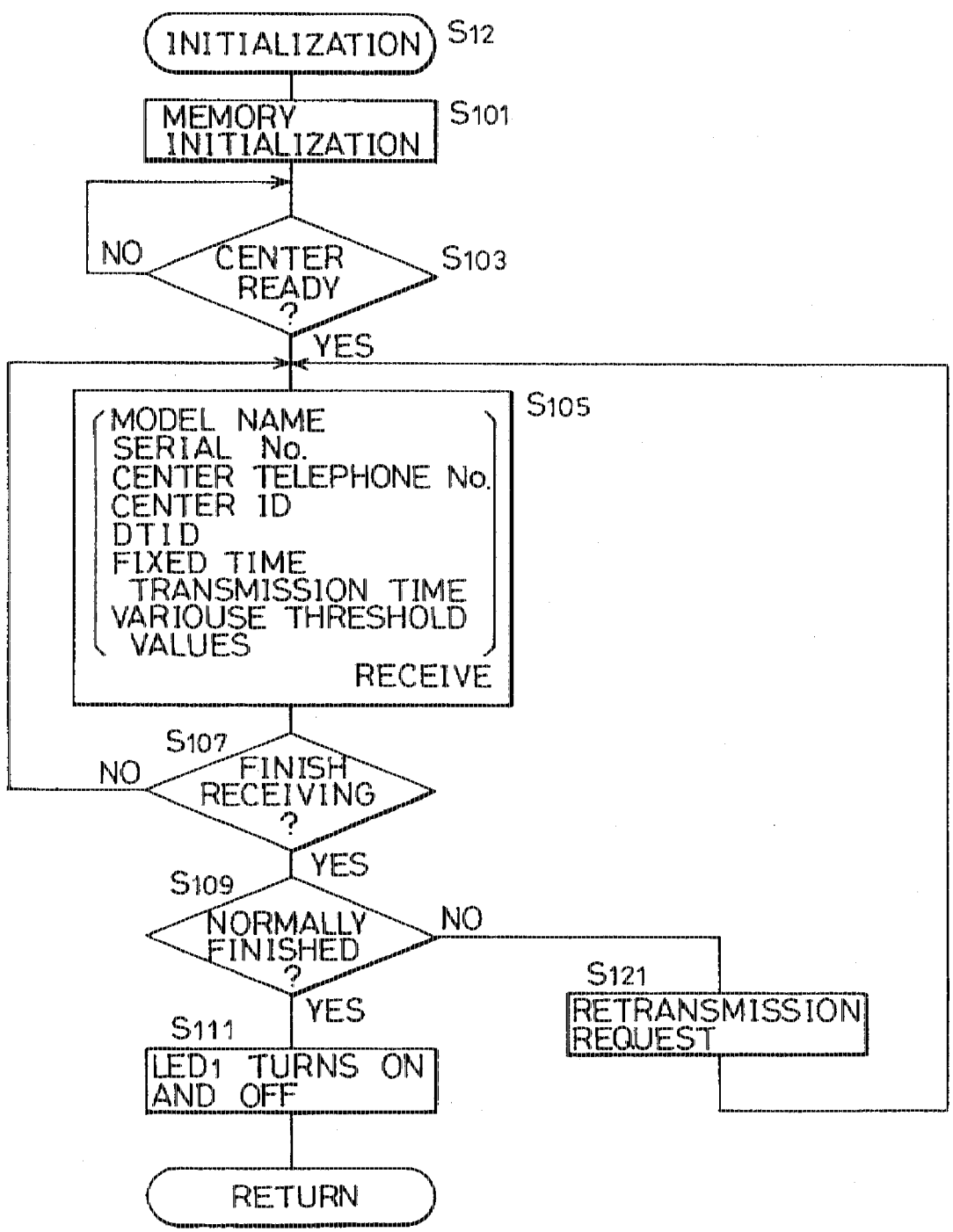
FIG. 23 is a flow chart showing specific contents of the initialization routine of FIG. 22.

* Initialization (FIG. 23)

This process. (S12) is carried out when dip switch DIP•SW 1 is ON when the power supply is turned on (YES in S11). This process is carried out with CPU 11 of data terminal 1 and CPU 91 of center side computer 90 being connected through CPU 11 side communication interface (RS232CI/F) 18 and CPU 91 side communication interface (RS232CI/F) 98 in the center.

First, the memory is initialized (S101).

Next, the ready of the center side CPU 91 connected through RS232CI/F98 • RS232CI/F18 is stood by (S103).

When the center side CPU 91 attains ready (YES in S103), the model name, the serial number of the copying machine to be connected, the telephone number of the center, the center ID, the data terminal ID, the fixed time transmission time data and threshold values of various kinds of element data • count data are received (S105).

When all the initial data have been received (YES in S107), a determination is made as to whether it has normally finished or not, and if it has (YES in S109), the LED 1 in the operation portion is turned on and off (S111) to inform an operator of that.

On the other hand, if it has not normally finished (NO in S109), retransmission of the data is request for the center side CPU 91 (S121).

Figure 24:
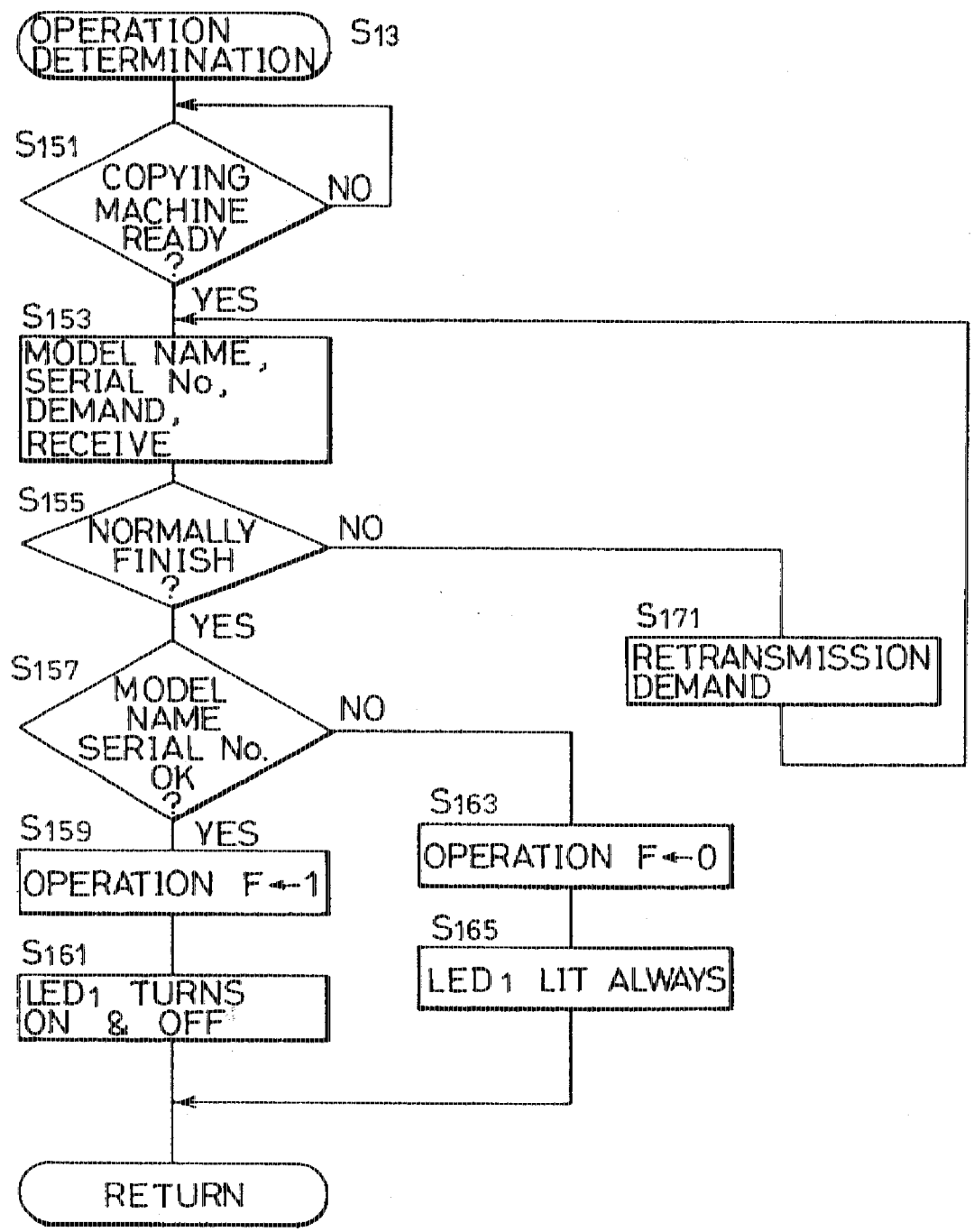
FIG. 24 is a flow chart showing specific contents of the operation determination routine of FIG. 22.
Figure 25A:
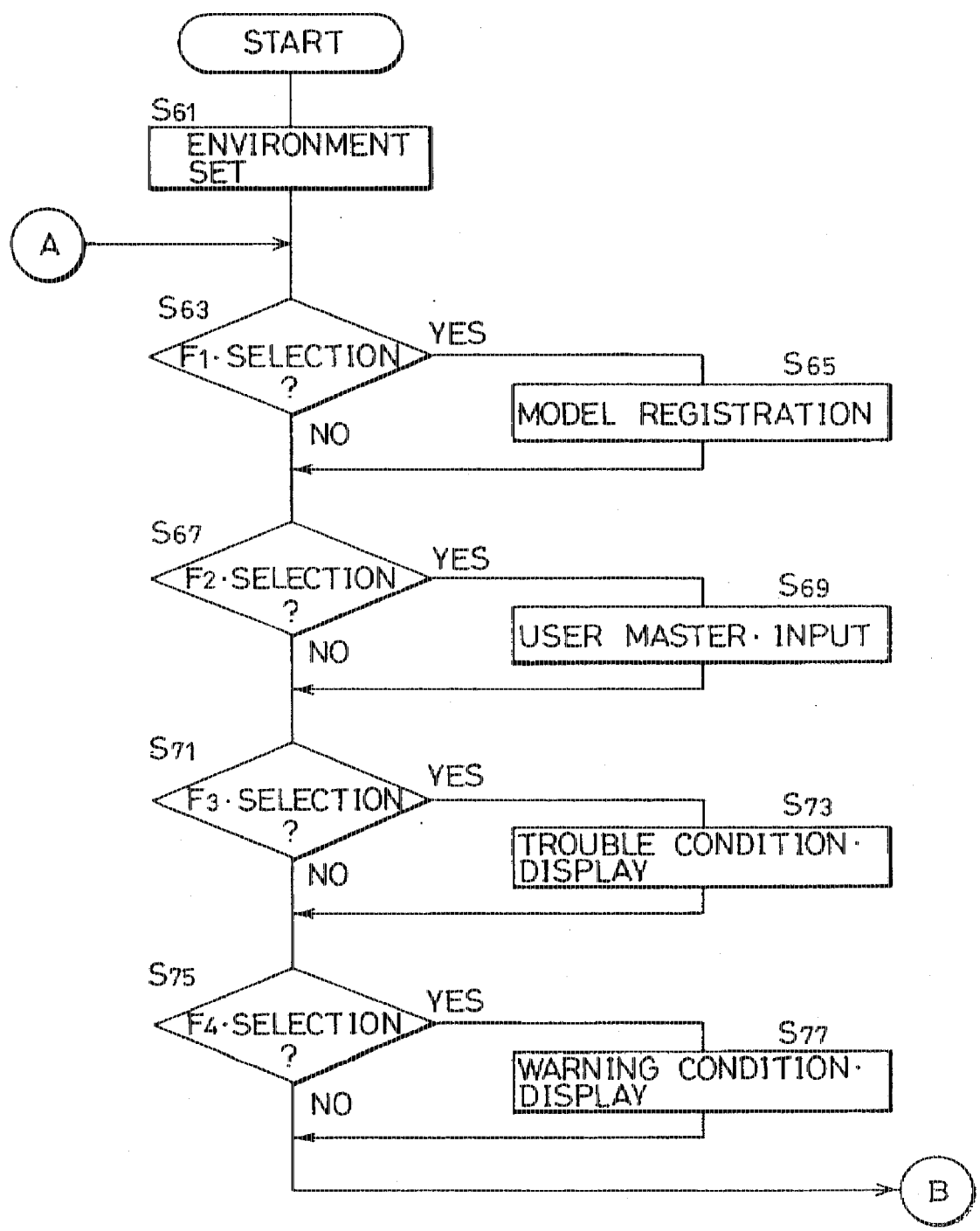
FIGS. 25A and 25B are flow charts showing the main routine of the controlling CPU on the center side in the second embodiment of the present invention.
Figure 25B:
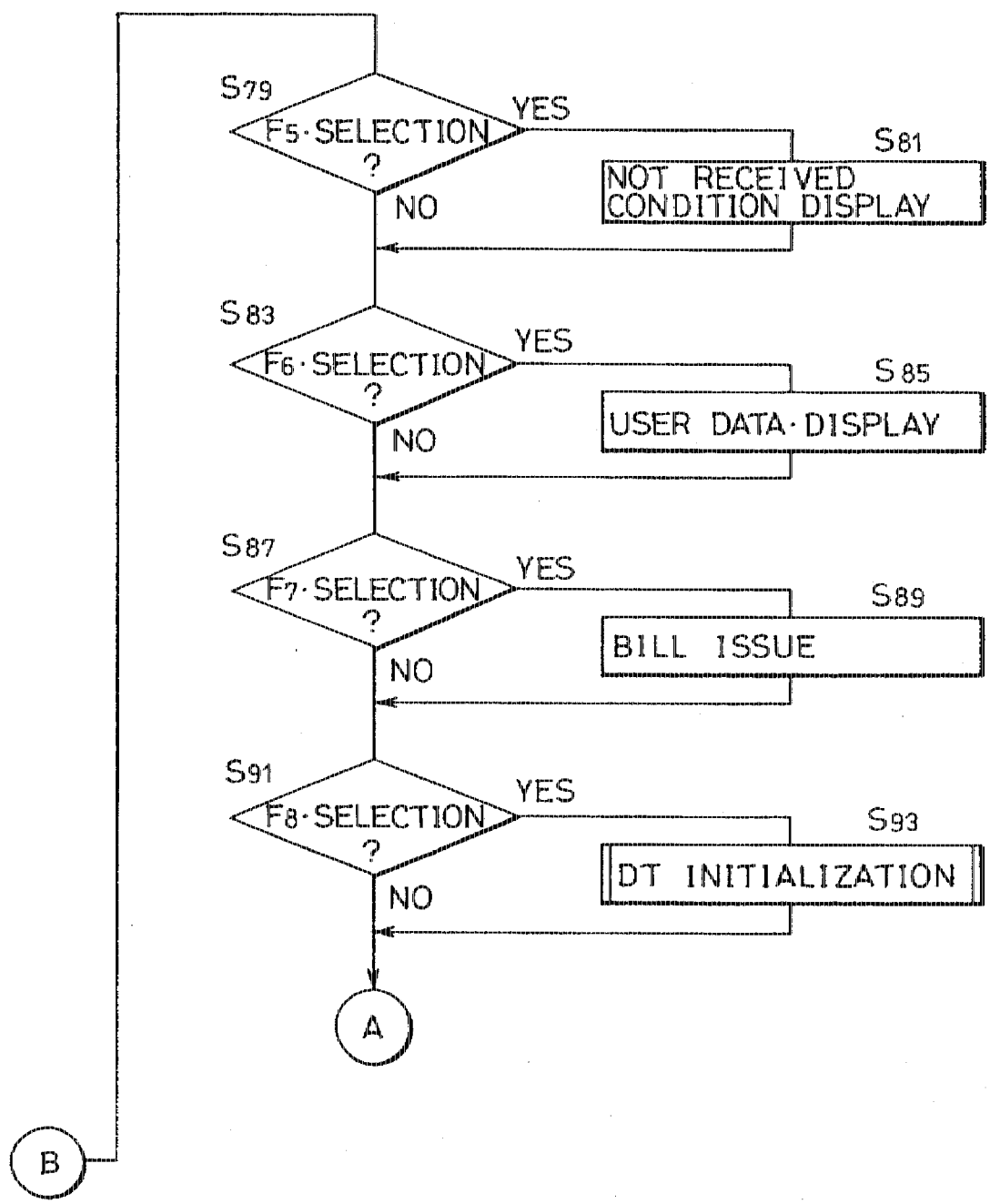

* Operation Determination (FIG. 24)

This process is carried out when dip switch DIP•SW1 is OFF in turning on of the power supply (NO in S11). As described above, the initialization of data terminals is conducted in the center, so that dip switch DIP•SW1 is always OFF with the data terminal being connected to the copying machine.

First, the ready of the CPU 41 on the connected copying machine side is stood by (S151).

When CPU 41 attains ready (YES in S151), the model name, the serial number data of that copying machine is requested and received (S153).

Subsequently, when the communication with CPU 41 has normally finished (YES in S155), the data received in step S153 is compared with the data received in step S105 (FIG. 23). As a result, when the two agree with each other (YES in S157), it means that a correct copying machine is connected (a copying machine to be connected), then the LED 1 is turned on and off to let the operator know that (S161) and also an operation flag is set to "1" (S159). By this, the copying operation process in that copying machine is enabled (refer to FIG. 22, S15).

On the other hand, in step S157, if it is determined "NO", it means that a wrong copying machine is connected, so that the operation flag is set "0" to forbid the copying operation (S163) and also LED 1 is turned on and off (S165) to let an operator know that.

If it is determined that the communication with CPU 41 of the copying machine has not been normally finished in step S155 (NO in S155), data retransmission is requested for CPU 41 (S171).

The operation determination process is conducted as described above, and when the data terminal is connected to a correct copying machine (a copying machine to be connected), the copying operation in that copying machine is permitted.

The processes by CPU 91 of the computer at the center are different from those of the first embodiment in that S91 and S93 are added thereto, so that only these points will be described.

F8 key operation (YES in S91)

Figure 26:
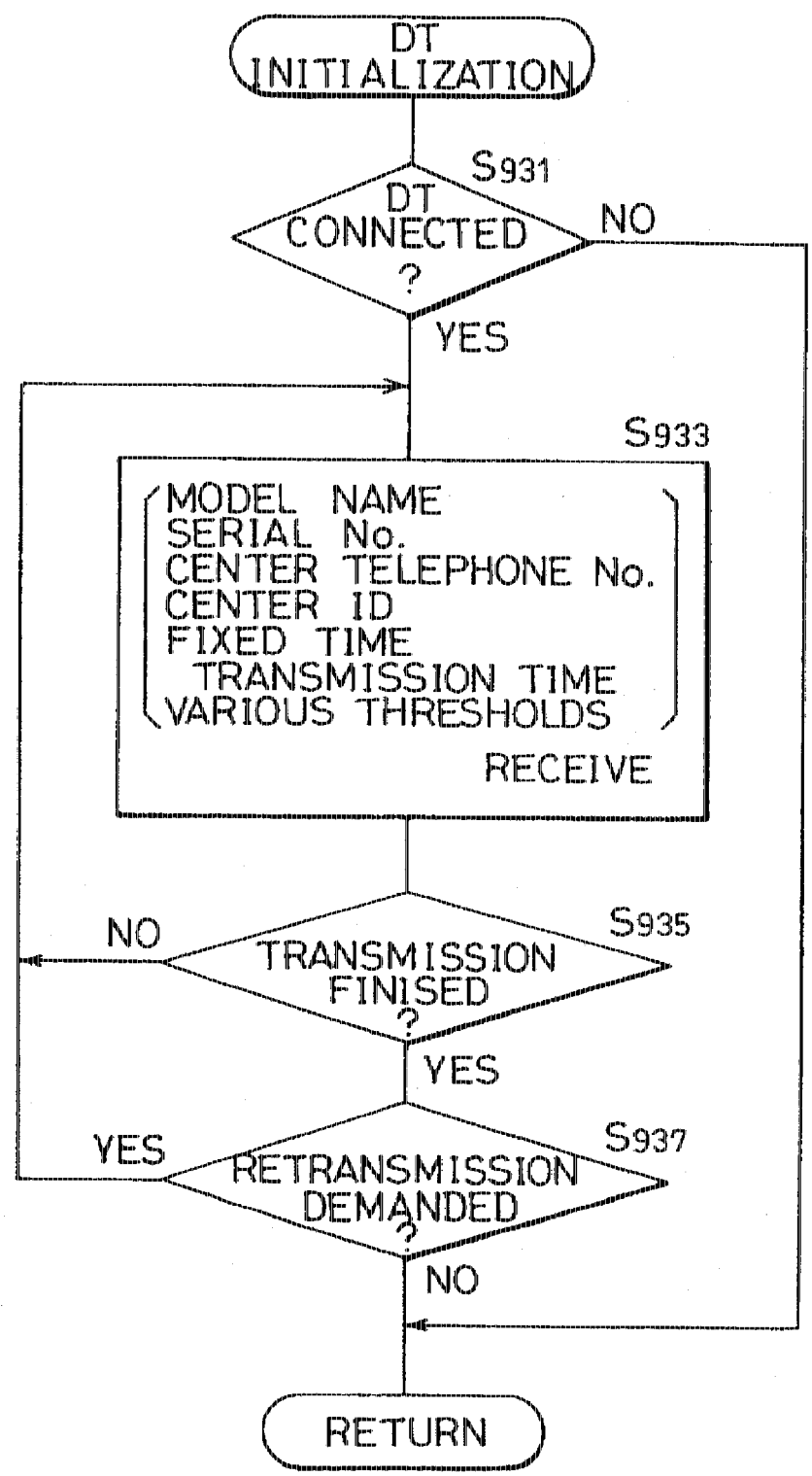
FIG. 26 is a flow chart showing specific contents of the DT initialization routine of FIG. 25B.

The initialization of data terminal 1 is performed (S93). That is, the sub routine process shown in FIG. 26 is implemented.

When the communication interface (RS232CI/F) 98 is connected to the communication interface (RS232CI/F) 18 and the dip switch DIP•SW1 is ON, it is regarded that the data terminal 1 is prepared (YES in S931), and the model name and serial number of the copying machine which is going to be connected, the center ID, the data terminal ID, the fixed time transmission time data, and threshold values of various element data and count data are transmitted (S933). When all the initial data have been transmitted (YES in S935), the present process is finished if there is no request of retransmission due to a receipt error from data terminal 1 (NO in S937). On the other hand, if retransmission is requested (YES in S937), it returns to step S933 to transmit all the initial data again.

As described above, in the second embodiment, a description is made about a copying machine control device and a copying machine control terminal device which make predetermined warning outputs when a copying machine control device is erroneously connected to a copying machine which is not an object of the control.

According to the second embodiment, occurrence of erroneously connecting a copying machine control device to a copying machine which is not an object of the control is surely prevented.

Accordingly, it is secured that the data collected on the control center side is the data of the copying machine which is objective to the control.

Next, the third embodiment of the present invention will be described.

In this third embodiment, presumptive center ID and DTID for initialization are set for a data terminal. The first embodiment and the third embodiment are different in some parts of the structure of the operation portion of data terminal, processes of CPU 41 of a copying machine, process of CPU 11 of a data terminal and processes of CPU 91 of the center. The third embodiment will be specifically described referring to FIG. 27 replacing FIG. 3 of the first embodiment, FIG. 28 replacing FIG. 6, FIG. 29 replacing FIG. 8 and FIG. 30 replacing FIG. 17.

In this third embodiment, the communication of the identification data between copying machines and DTs (the first embodiment and the second embodiment) is omitted, but it may be implemented similarly to the first and second embodiments.

Figure 27:
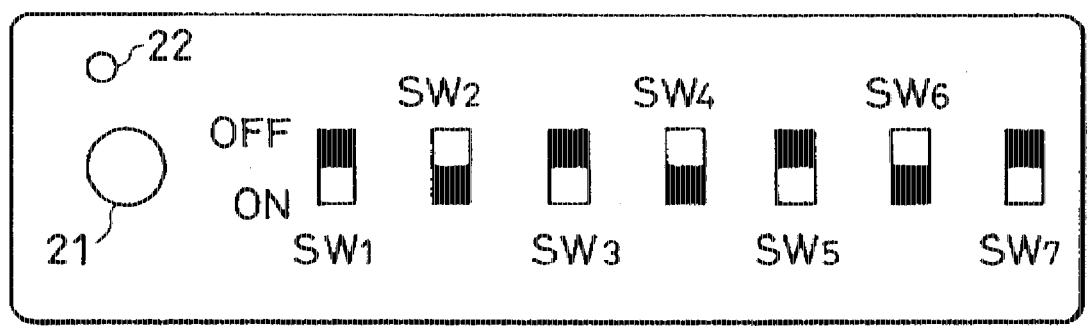
FIG. 27 is a diagram for describing operation switches in accordance with the third embodiment of the present invention.

As shown in FIG. 27, seven dip switches DIP•SW1–DIP•SW7 and a push switch 21 are provided as operation switches in a data terminal.

DIP•SW4 is a switch for setting an initialization mode. DIP•SW1–DIP•SW3 are employed for setting temporary DTID (ID of a data terminal), and DIP·SW5–DIP·SW7 are switches for setting temporary center ID. That is, by combination of ONs and OFFs of these dip switches, temporary IDs are defined. Such temporary IDs are employed only in the initialization which is set at the center in shipping. Push switch 21 is a switch for commanding to switch a terminal device to be connected to the communication line from a telephone machine 53 to a modem 52. That is, in the initialization process, first, an operator calls the center side using telephone machine 53 and operates push switch 21 after confirming connection with the computer at the center, then the user side terminal device of the communication line is switched from telephone machine 53 to modem 52 to implement the initialization.

Figure 28:
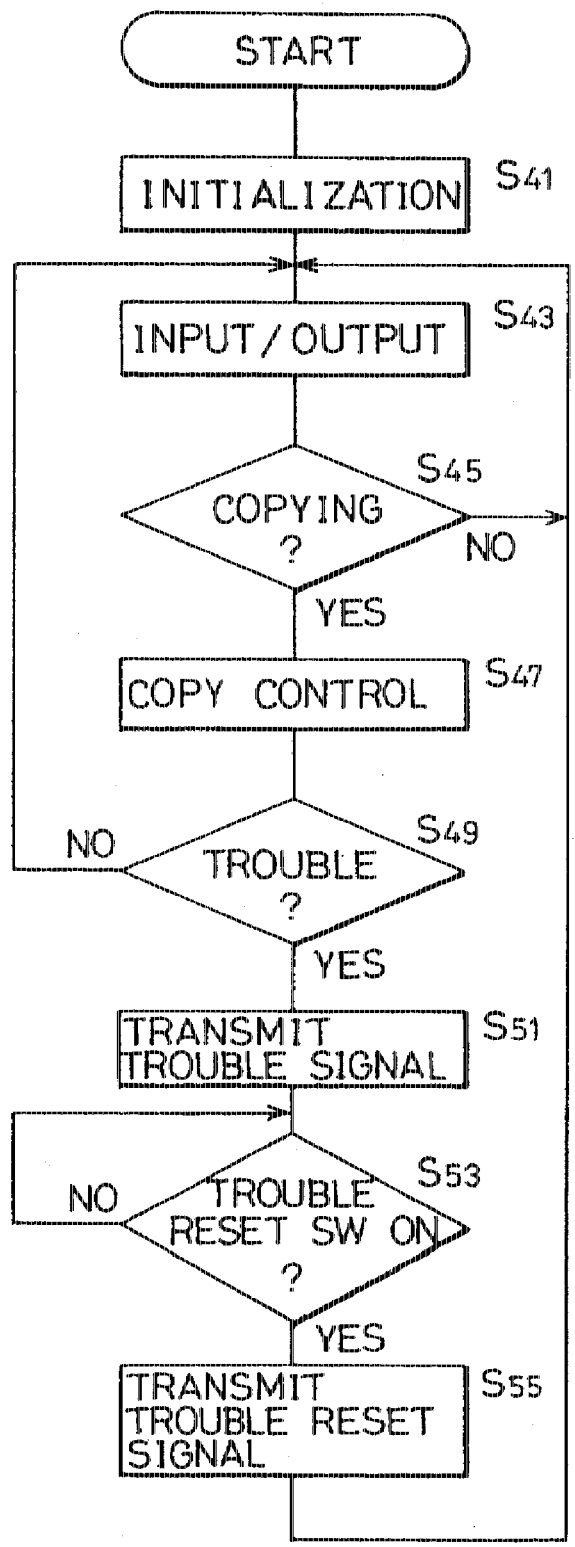
FIG. 28 is a flow chart showing the main routine of the controlling CPU of a copying machine according to the third embodiment of the present invention.

FIG. 28 is a flow chart indicating processes by controlling CPU 41 of a copying machine in the third embodiment. This flow chart is made only by eliminating steps S45 and S47 from the flow chart of FIG. 6 in the first embodiment, so that description thereof is not repeated.

Figure 29:
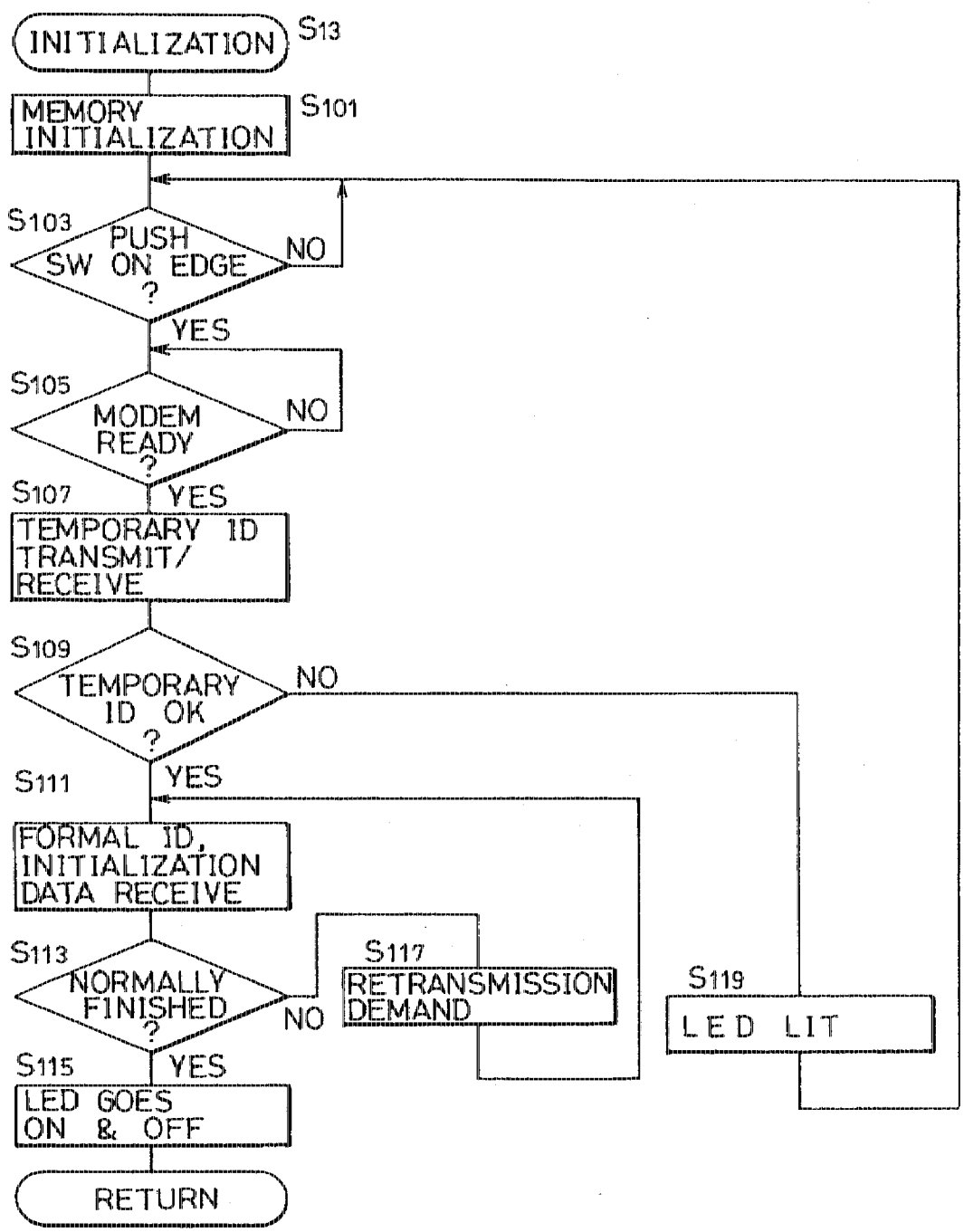
FIG. 29 is a flow chart showing specific contents of the initialization routine by the controlling CPU of the data terminal according to the third embodiment of the present invention.

The initialization sub routine in the third embodiment is shown in FIG. 29.

* Initialization (FIG. 29)

This process is executed when dip switch DIP·SW4 is ON when the power supply is turned on (YES in S11).

First, the memory is initialized (S101).

Next, when the connection with the communication line is switched from telephone machine 53 to modem 52 by operation of push switch 21 (YES in S103) and furthermore modem 52 attains ready (YES in S105), transmission and receipt of temporary IDs are made with CPU 91 of the control center.

When the center ID transmitted from the center side in step S107 agrees to the temporary center ID set by dip switches DIP·SW5–DIP·SW7 (YES in S109), the data transmitted from the center side (formal center ID, formal DTID, initialization data) is received and stored in the memory (S111).

When the communication has been normally finished (YES in S113), LED element 22 is turned on and off to display the fact (S115).

When the center ID transmitted from the center side does not agree to the temporary center ID set with dip switches DIP·SW5–DIP·SW7 (NO in S109), LED element 22 is lit to make the warning (S119) and it returns to step S103.

If the communication has not been normally finished in step S113 (NO in S113), retransmission of the initialization data and the like is requested to the center (S113).

Figure 30:
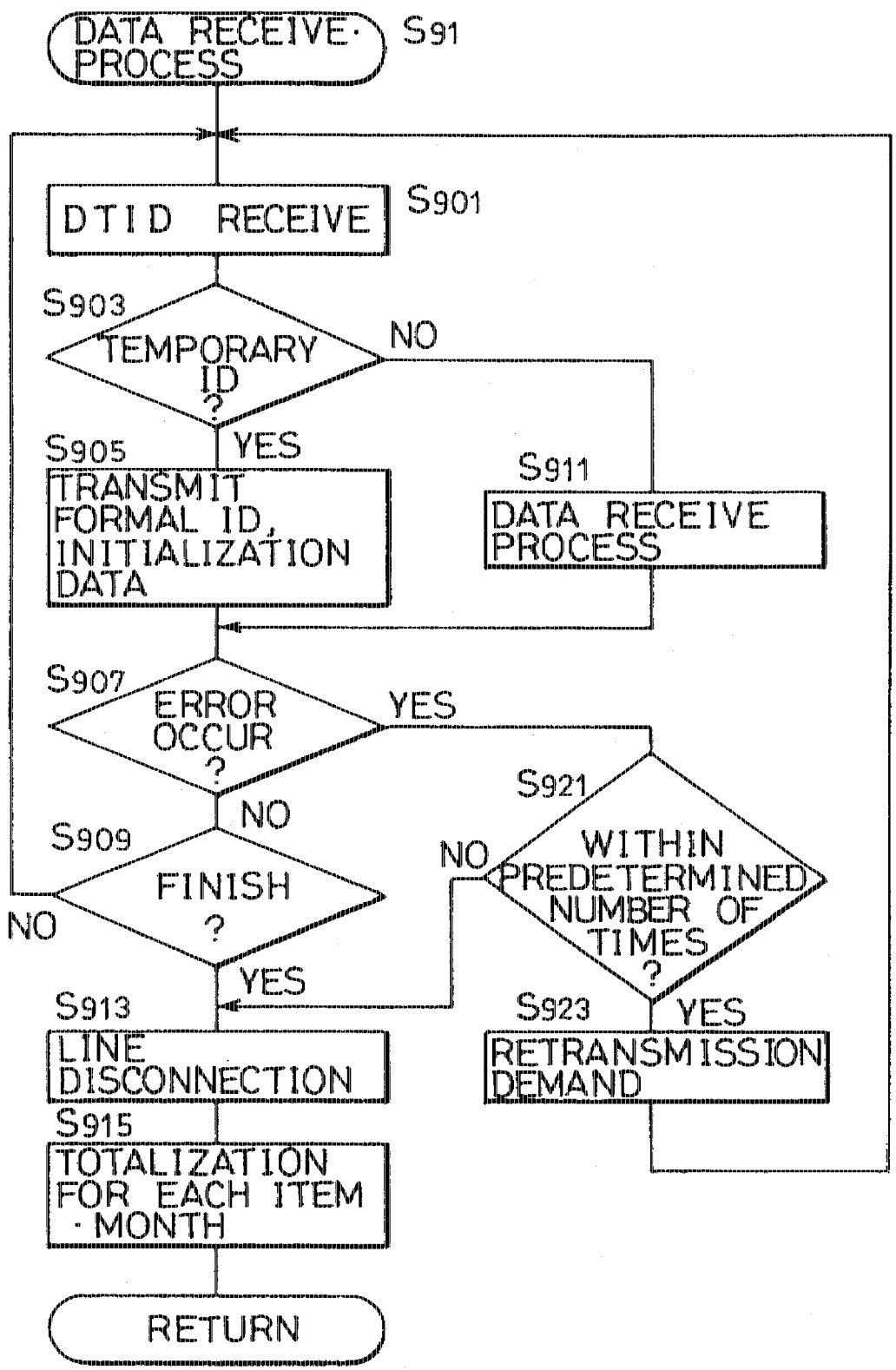
FIG. 30 is a flow chart showing specific contents of the data receiving/processing routine of the controlling CPU on the center side according to the third embodiment of the present invention.

The data receiving process of CPU 91 in the third embodiment is shown in FIG. 30.

CPU 91 receives data from the communication line by interruption process and also applies predetermined processes to the received data (S91).

First, when an interruption by receipt from the communication line is produced, DTID is received (S901).

Next, a determination is made as to whether the DTID received in S901 is temporary ID or not. As a result, if it is temporary ID (YES in S903), formal ID and initialization data are transmitted to the data terminal side (S905).

If the ID received in step S901 is not temporary ID, that is, when it is formal ID (NO in S903), the data receiving process is conducted (S911). The data transmitting process is also performed if needed.

When a communication error occurs (YES in S907), on condition that the number of times of the error occurrence is within a predetermined number of times (YES in S921), retransmission of data is requested (S923), and it returns to step S901. If the number of times of occurrence of communication error exceeds a predetermined number of times (NO in S921), the communication line with the data terminal side is disconnected (S913).

When the communication with the data terminal side is finished (YES in S909) without a communication error (NO in S907), after disconnecting the communication line to the data terminal (S913), totalization is made for each item and month to produce data for screen display by an operator selection (S915).

As described above, processes in CPU 41 of a copying machine, CPU 11 of a data terminal, and CPU 91 at the center are performed, and the present system in which each user and the center which is a control party is connected by the communication line is controlled.

As described above, the third embodiment is a copying machine control device which holds temporary ID in advance and implements the first communication in installation to a user's copying machine is made after mutual confirmation with the temporary ID.

According to the third embodiment, ID does not have to be inputted in installation at a user, so that input mistakes can be prevented.

The time taken by the installation can be reduced.

Also, the formal ID data can be included in the initialization data transmitted from the control center side in installation.

Next, the fourth embodiment of the present invention will be described.

In this fourth embodiment, the safety of the communication between data terminals and a center is enhanced. The above-described first embodiment and the fourth embodiment are different in some parts of processes by CPU 11 of data terminals and processes of CPU 91 at the center. The fourth embodiment is specifically described referring to FIGS. 31A and 31B replacing FIG. 13 in the first embodiment and FIG. 32 replacing FIG. 17.

Figure 31A:
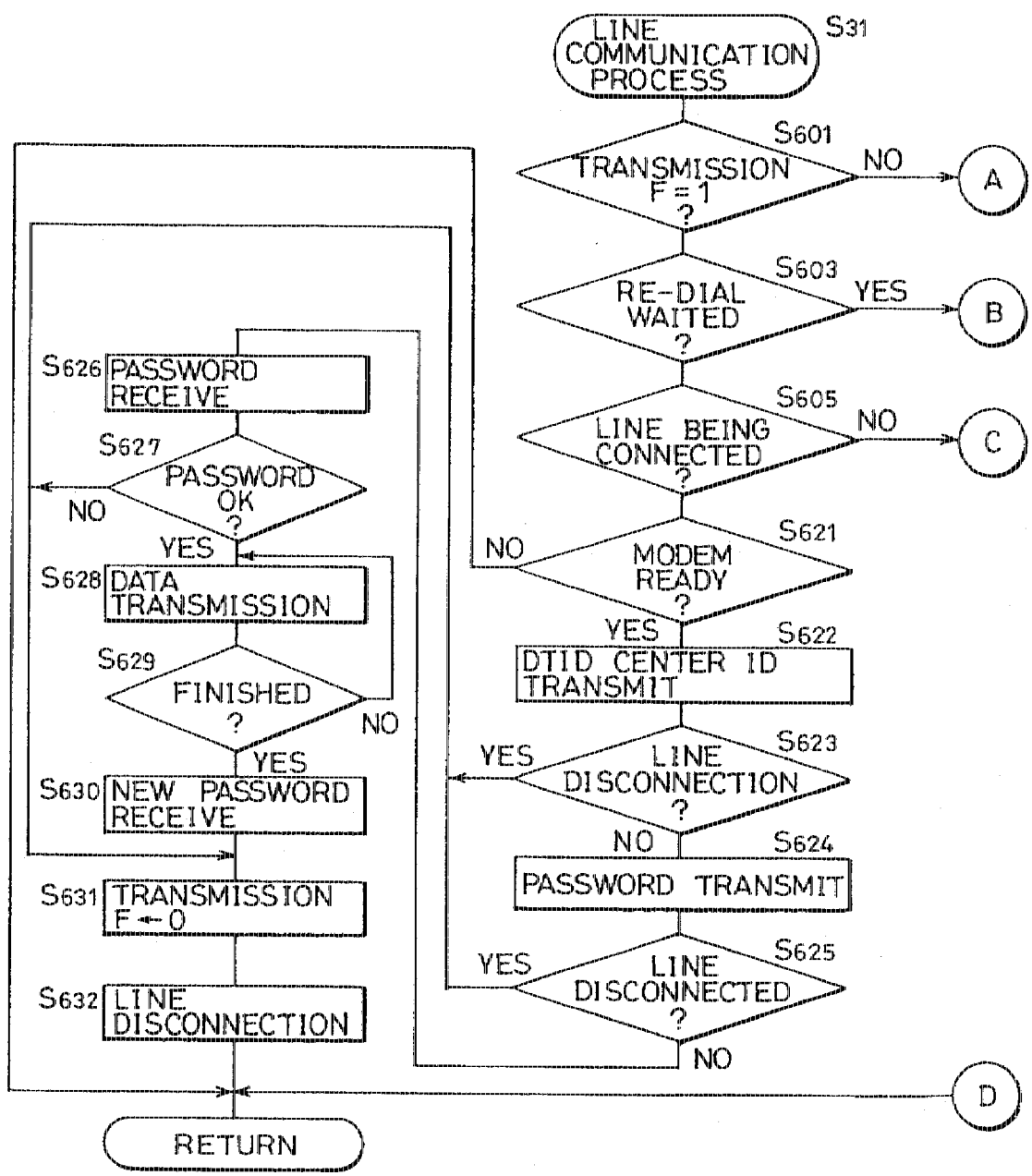
FIGS. 31A and 31B are flow charts showing specific contents of the line communication process routine by the controlling CPU of a data terminal according to the fourth embodiment of the present invention.
Figure 31B:
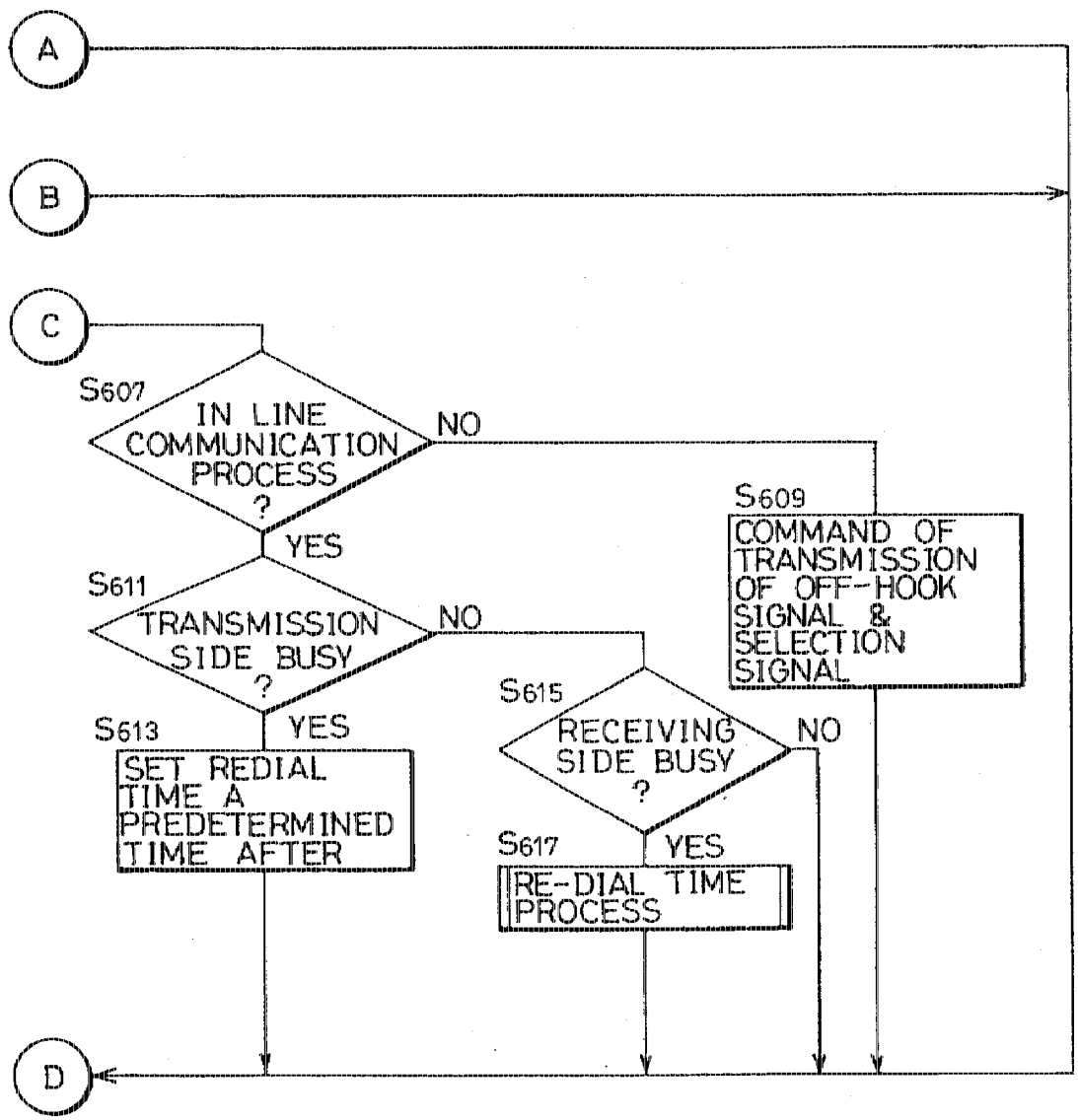

The line communication process sub routine in the fourth embodiment is shown in FIGS. 31A and 31B.

The processes of S601–S621 is the same as that of FIG. 13 (the first embodiment), so that the description thereof is not repeated here.

When data transmission to the center is enabled (YES in S621), first, DTID and, center ID are transmitted (S622). As a result, if both of the ID data are correct, because the communication line on the center side is not disconnected (refer to NO in S623, YES in S903), next, a center password is transmitted (refer to S624, S905). As a result, if the center password is correct, because the communication line is not disconnected on the center side (refer to NO in S625 and YES in S907), a DT password is transmitted from the center side, and the DT password is received (refer to S626, S909).

The DT password is compared with the DT password stored in the process (described later) in the previous step S630, and when they agree (YES in S627), the data is transmitted to the center side (S628).

After the data transmission has been finished (YES in S629), two "new passwords" transmitted from the center side are received, and with the two "new passwords", the data in the predetermined password area in RAM 15 is updated (refer to S630, S919).

Subsequently, a transmission flag is reset to "0" (S631), and the communication line on the data terminal side is disconnected (S632).

If the communication line is disconnected on the center side due to an error of the ID or password (refer to YES in S623, NO in S903, or refer to YES in S625, NO in S907), and when the password transmitted from the center side is wrong (NO in S627), it proceeds to step S631, and after resetting the transmission flag to "0", the communication line on the data terminal side is disconnected (S632).

Figure 32:
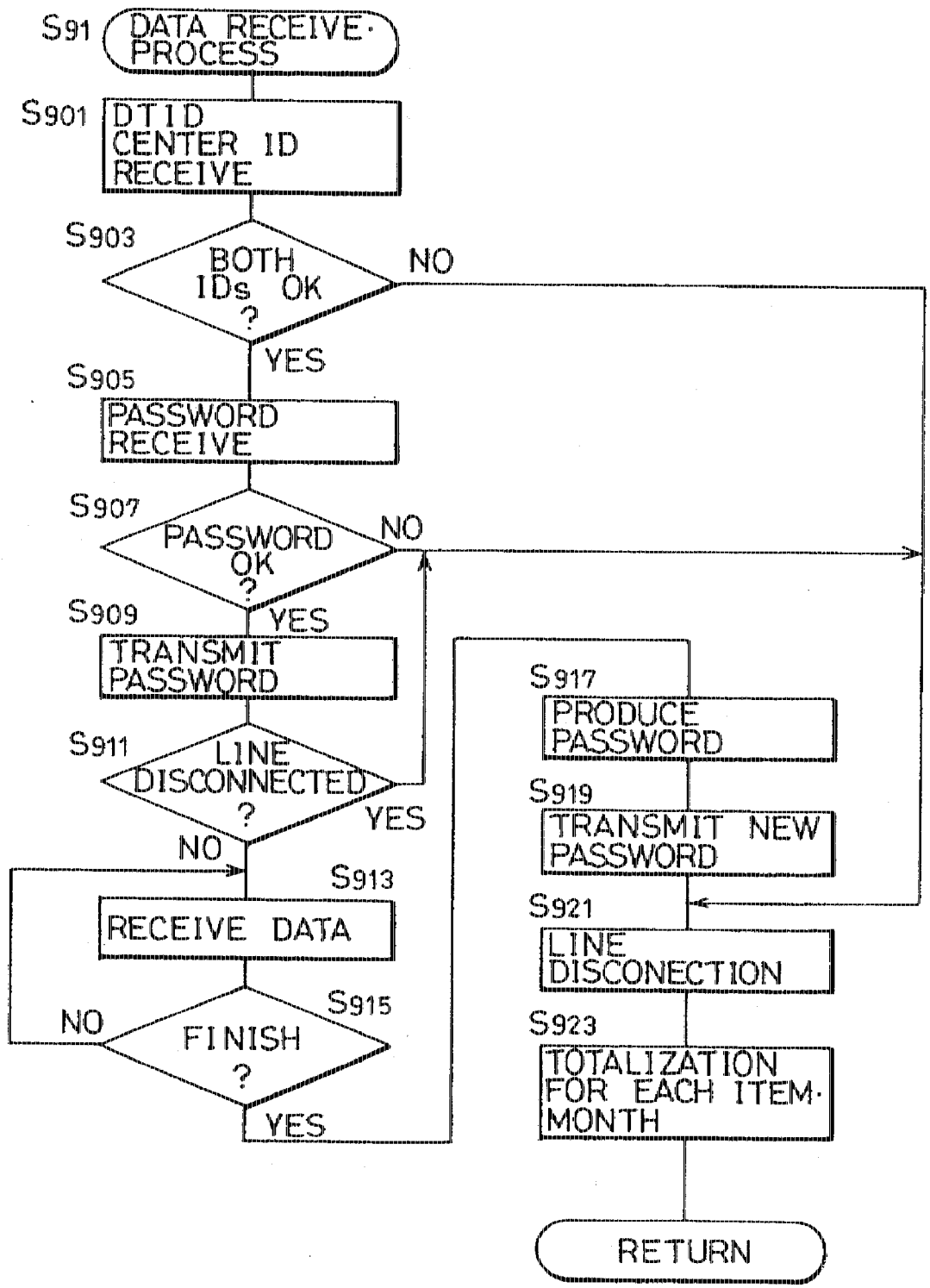
FIG. 32 is a flow chart showing specific contents of the data receiving/processing routine by the controlling CPU on the center side according to the fourth embodiment of the present invention.

The data receiving process by CPU 91 in the fourth embodiment is shown in FIG. 32.

CPU 91 receives data transmitted from data terminals by an interruption process and also applies predetermined processes to the received data (S91).

First, when an interruption occurs due to receipt from the data terminal side, DTID, and the center ID are received (refer to S901, S622), and confirmed.

As a result, both of the IDs are correct (YES in S903), the center password transmitted from the data terminal side is received and compared with the center password stored in the process (described later) in the previous step S917 (refer to S905, S624).

As a result, both of them agree (YES in S907), the DT password stored in the process in the previous step S917 is transmitted to the data terminal side (refer to S909, S626).

If the DT password is correct, because the communication line is not disconnected on the data terminal side (refer to NO in S911, YES in S627), the data transmitted from the data terminal side is received (refer to S913, S628). The data transmission process is also performed if needed.

When the data receipt is finished (YES in S915), new passwords (DT password and a center password) are produced on the basis of random numbers, and stored in a predetermined memory area (S917), and the two "new passwords" are transmitted to the data terminal side (refer to S919, S630).

Subsequently, the communication line is disconnected (S921), totalization is made for every item and month to produce data to be displayed on a screen by operator's selection (S923).

When the DTID, the center ID, or the password transmitted from the data terminal side in reception are wrong (NO in S903, or NO in S907), and when the communication line on the data terminal side is disconnected because the password transmitted to the data terminal is wrong (refer to YES in S911, NO in S627), the communication line is disconnected on the center side (S921).

As described above, processes in CPU 41 of the copying machines, CPU 11 of the data terminals, and processes in the center CPU 91 are conducted and each user and the center which is a controlling party are connected by the communication line. Also, every time the communication is finished, a new password is set.

As described above, the fourth embodiment includes a copying machine control device, and a centralized control device connected to the control device through the communication line, wherein mutual confirmation is made with passwords before starting the data communication between both devices and new passwords are mutually set before finishing the data communication.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for collecting data related to a copying machine and communicating with a centralized control unit on the basis of the collected data, comprising:

storing means, in said control device, for storing identification data for identifying a copying machine to be connected;

receiving means for receiving identification data from the copying machine; and warning means for comparing the identification data stored in said storing means and the identification data received by the receiving means and generating a warning when the two disagree.

2. A copying machine control system including a data terminal for collecting data related to a copying machine and a centralized control unit for communicating with the data terminal through a communication network, wherein said data terminal comprises:
first storing means for storing first and second passwords,
first password transmitting means for transmitting the first password stored in said first storing means to said centralized control unit after a connection is made to said centralized control unit,
first password receiving means for receiving a password from said centralized control unit after connection is made to said centralized control unit, and
first comparing means for comparing the password received by said first password receiving means and the second password stored in said first storing means and permitting data communication when the two agree with each other, and said centralized control unit comprises,
second storing means for storing said first and second passwords,
second password transmitting means for transmitting the second password stored in said second storing means to said data terminal after a connection is made to said data terminal,
second password receiving means for receiving a password from said data terminal after a connection is made to said data terminal, and
second comparing means for comparing the password received by said second password receiving means and the first password stored in said second storing means to permit data communication when the password received by said second password receiving means and the first password stored in said second storing means agree with each other.

3. The copying machine control system according to claim 2, wherein
said centralized control unit further comprises,
first updating means for updating the first and second passwords stored in said second storing means, and
third password transmitting means for transmitting to said data terminal the first and second passwords updated by said first updating means, and
said data terminal further comprises,
second updating means for updating the first and second passwords stored in said first storing means to the first and second passwords transmitted from said third password transmitting means of said centralized control unit.

4. The copying machine control system according to claim 3, wherein the first updating means of said centralized control unit updates said first and second passwords during every communication with said data terminal.

5. A control device for collecting data related to a copying machine and communicating with a centralized control unit on the basis of the collected data, comprising:

storing means for storing first and second passwords;
password transmitting means for transmitting the first password stored in said storing means to said centralized control unit after a connection is made to said centralized control unit;

password receiving means for receiving a password from said centralized control unit after a connection is made to said centralized control unit;

control means for comparing the password received by said password receiving means and the second password stored in said storing means and permitting communication of data when the password received by said password receiving means and the second password agree with each other; and updating means for updating the first and second passwords stored in said storing means to new first and second passwords transmitted from said centralized control unit after data communication is permitted.

6. An initialization method of a copying machine control system including a data terminal for collecting data related to a copying machine and a centralized control unit for communicating with said data terminal through a communication network, comprising the steps of:

providing an identification code to said data terminal;

storing the identification code provided to said data terminal into said centralized control unit;

installing said data terminal, to which the identification code has been provided, to the copying machine which is intended to be controlled thereby;

transmitting the identification code from the installed data terminal to said centralized control unit;

confirming the identification code transmitted from the installed data terminal by said centralized control unit;

transmitting data for initialization from said centralized control unit to the installed data terminal after confirming the identification code; and carrying out an initialization operation by the installed data terminal on the basis of the data for initialization transmitted from said centralized control unit.

7. A copying machine control system including a data terminal for collecting data related to a copying machine and a centralized control unit for communicating with said data terminal through a communication network, wherein said data terminal comprises:

holding means for holding an identification code for initialization, and first transmitting means for transmitting the identification code for initialization to said centralized control unit when said data terminal is connected to the copying machine which is intended to be controlled, said centralized control unit comprises:

storing means for storing the identification code for initialization held in said data terminal, confirming means for confirming said data terminal on the basis of the identification code for initialization transmitted from said first transmitting means of said data terminal, and second transmitting means for transmitting data for initialization to the data terminal confirmed by said confirming means, and said data terminal further comprises:

initialization means for initializing said data terminal on the basis of the data for initialization transmitted from the second transmitting means of said centralized control unit.

8. The copying machine control system according to claim 7, wherein said initialization data comprises a formal identification code and said data terminal further comprises storing means for storing the formal identification code.

9. A copying machine control system comprising:

a data terminal provided in the copying machine and connected to an external centralized control unit through a communication network;

setting means for setting primary identification codes for both said centralized control unit and said data terminal;

memory means for storing the primary identification codes set by said setting means;

initial confirming means for performing mutual confirmation with said centralized control unit by said primary identification codes through said data terminal when the copying machine is installed;

initialization means provided in said centralized control unit for transmitting data for initializing said data terminal and for transmitting a mutual identification code used for mutual confirmation with said centralized control unit for subsequent times when the mutual confirmation by said initial confirming means was completed; and a control circuit to initialize said data terminal based on data for said initialization and to maintain the transmitted mutual identification code.

10. A copying machine control system according to claim 9, wherein said centralized control unit is connected to a plurality of data terminals and effects mutual confirmation with each data terminal by different mutual identification codes.

11. A copying machine control apparatus connected to the copying machine, communicating control information data with a centralized control unit provided at the position remote to the copying machine, comprising:

information collecting means for collecting first information relating to a number obtained by operation of the copying machine and second information different from the first information;

determining means for determining whether the second information is within a prescribed range;

communication means for transmitting an indication that the second information exceeds the prescribed range to the centralized control unit when said determining means determines that the second information exceeds the prescribed range; and updating means for automatically updating said prescribed range based on said first information.

12. A copy machine control apparatus according to claim 11, wherein said first information is information related to a number of copying operations by the copying machine, obtained by calculating frequency of use of said copying machine from the number of copying operations within a prescribed period; and said updating means narrows said prescribed range when said frequency of use is high and expands said prescribed range when the frequency of use is low.

13. A control unit for collecting data related to a copying machine and communicating with a centralized control unit on the basis of the collected data, comprising:

collecting means for collecting data related to operation of the copying machine;

determining means for determining whether or not said collected data is in a permittable range;

communicating means for calling said centralized control unit when said collected data is outside of the permittable range;

calculating means for calculating frequency of use of said copying machine; and updating means for updating the permittable range of said determining means on the basis of the frequency of use of said copying machine.

14. The control unit according to claim 13, wherein said updating means expands the permittable range of said determining means when the frequency of use of said copying machine is lower than a predetermined frequency, and narrows said permittable range when said frequency of use is equal to or higher than said predetermined frequency.

15. The control unit according to claim 13, wherein said collecting means collects data related to paper jams.

* * * * *